US011792761B2

(12) United States Patent
Zhu et al.

(10) Patent No.: US 11,792,761 B2
(45) Date of Patent: Oct. 17, 2023

(54) SESSION MANAGEMENT FUNCTION REGISTRATION AND DEREGISTRATION

(71) Applicant: ZTE Corporation, Guangdong (CN)

(72) Inventors: Jinguo Zhu, Guangdong (CN); Zhijun Li, Guangdong (CN); Xingyue Zhou, Guangdong (CN); Tricci So, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/831,979

(22) Filed: Jun. 3, 2022

(65) Prior Publication Data
US 2022/0408397 A1 Dec. 22, 2022

Related U.S. Application Data

(63) Continuation of application No. PCT/CN2019/123791, filed on Dec. 6, 2019.

(51) Int. Cl.
H04W 76/11 (2018.01)
H04W 60/06 (2009.01)
H04W 80/10 (2009.01)

(52) U.S. Cl.
CPC ............ H04W 60/06 (2013.01); H04W 80/10 (2013.01)

(58) Field of Classification Search
CPC .................................................... H04W 60/06
See application file for complete search history.

(56) References Cited

U.S. PATENT DOCUMENTS

| 10,425,987 | B2 | 9/2019 | Yang et al. | |
|---|---|---|---|---|
| 10,687,300 | B2 | 6/2020 | Youn et al. | |
| 10,917,868 | B2 | 2/2021 | Youn et al. | |
| 2019/0007500 | A1* | 1/2019 | Kim | H04L 67/141 |
| 2019/0098536 | A1* | 3/2019 | Qiao | H04W 36/32 |
| 2019/0191467 | A1 | 6/2019 | Dao et al. | |
| 2019/0394745 | A1* | 12/2019 | Yu | H04W 76/11 |

FOREIGN PATENT DOCUMENTS

| CN | 108323245 A | 7/2018 |
|---|---|---|
| CN | 108684073 A | 10/2018 |

(Continued)

OTHER PUBLICATIONS

Chinese office action issued in CN Patent Application No. 2019801028005, dated Apr. 7, 2023, 13 pages. English translation included.

(Continued)

Primary Examiner — Michael T Vu
(74) Attorney, Agent, or Firm — Perkins Coie LLP

(57) ABSTRACT

Methods, apparatus and systems for backward compatible multi-access protocol data unit session (PDU) registration and deregistration are described. One method of digital communication includes establishing, by a session management function operating in a communication network, a PDU session for a wireless device and transmitting, upon successfully establishing the PDU session, a registration request to a network-side function to register a context of a PDU session of the wireless device with the network-side function, wherein the registration request identifies a set of session management functions that includes the session management function.

18 Claims, 17 Drawing Sheets

(56) References Cited

FOREIGN PATENT DOCUMENTS

WO  2018097599 A1  5/2018
WO  2018169244 A1  9/2018

OTHER PUBLICATIONS

International Search Report and Written Opinion dated Sep. 2, 2020 for International Application No. PCT/CN2019/123791, filed on Dec. 6, 2019 (8 pages).
LG Electronics, "Discussion on MA PDU establishment when VPLMN does not support ATSSS," 3GPP TSG-SA2 Meeting #135, S2-1909615, Split, Croatia, Oct. 14-18, 2019, 2 pages.
ZTE, "SMF Set ID in SMF Registration," 3GPP TSG-Ct WG4 Meeting #95, C4-195159, Reno, USA, Nov. 11-15, 2019, 3 pages.
European search report issued in EP Patent Application No. 19952183.2, dated Aug. 3, 2023, 12 pages.
Huawei et al., "SMF Set and UPF," 3GPP TSG-SA WG2 Meeting #135, S2-1910554, revision of S2-1907217, Oct. 14-18, 2019, Split Croatia, Change Request, 2 pages.
Samsung, "Correction on SM context transfer procedure," 3GPP TSG-SA WG2 Meeting #135, S2-1910156, revision of 9176, Oct. 14-18, 2019, Split, Croatia, Change Request, 4 pages.

\* cited by examiner

SESSION MANAGEMENT FUNCTION REGISTRATION AND DEREGISTRATION

CROSS-REFERENCE TO RELATED APPLICATIONS

This application is a continuation of International Patent Application No. PCT/CN2019/123791, filed on Dec. 6, 2019, the contents of which are incorporated herein by reference in their entirety.

TECHNICAL FIELD

The present document relates to digital communication related to wireless networks.

BACKGROUND

After the release of initial version of the 5G specification, sometimes called Release-15, the Third Generation Partnership Project (3GPP) is already looking at further feature additions to this technology in the upcoming Release-16 revision. The new release is expected to provide additional flexibility to the existing 5G protocols and at the same time be backwards compatible with Release-15 to the extent possible.

SUMMARY

The present document describes techniques that may be embodiments into network-side functionality and/or user devices in a wireless network. These embodiments are able to allow registration and deregistration of multi-access protocol data unit (PDU) sessions, while maintaining compatibility with networks that implement different or previous versions of PDU session registration and deregistration protocols.

In one example aspect, a method of digital communication is disclosed. The method includes establishing, by a session management function operating in a communication network, a protocol data unit (PDU) session for a wireless device; and transmitting, upon successfully establishing the PDU session, a registration request to a network-side function to register a context of a PDU session of the wireless device with the network-side function, wherein the registration request identifies a set of session management functions that includes the session management function.

In another example aspect, a digital communication method is disclosed. The method includes releasing, by a session management function operating in a communication network, resources previously allocated to a protocol data unit (PDU) session for a wireless device; and transmitting, upon successfully releasing the resources of the PDU session, a deregistration request to a network-side function to deregister a context of a PDU session of the wireless device with the network-side function, wherein the registration request identifies a set of session management functions that includes the session management function.

In yet another example aspect, another method of digital communication is disclosed. The method includes receiving, at a network-side function operating in a communication network, a registration request from a session management function to register a context of a protocol data unit (PDU) session of a wireless device, wherein the registration request identifies a set of session management functions that includes the session management function; storing the context at the network-side function including an identifier of the set; and sending, in response to the registration request a response to the session management function.

In yet another example aspect, another method of digital communication is disclosed. The method includes receiving, at a network-side function operating in a network, a deregistration request from a session management function to deregister a context of a protocol data unit (PDU) session of a wireless device, wherein the deregistration request identifies a set of session management functions that includes the session management function; determining an action to perform in response to the deregistration request, wherein the action is one of: (a) accepting the deregistration request and deregistering the context in case that the context was registered due to a registration request received from the session management function, or (b) accepting the deregistration request and deregistering the context in case that the context was registered due to a registration request received from another session management function included in the set of session management functions, or (c) processing the deregistration request based on a rule; and communicating a result of the action in a deregistration response message to the session management function.

In yet another example aspect, a method of digital communication is disclosed. The method includes establishing, by a session management function implemented on a hardware platform, a multi-access protocol data unit (MA-PDU) session for a wireless device, wherein the MA-PDU session provides data connectivity through networks implementing different radio access technologies; transmitting, upon successfully establishing the MA-PDU session, a registration request to a network-side function to register a context of the wireless device with the second network-side function, wherein the registration request identifies a set of session management functions that includes the session management function.

In yet another example aspect, a method of digital communication, is disclosed. The method includes receiving, at a first time, at a network function implemented in a communication network, a first registration request from a first session management function (SMF1) to register a first context of a protocol data unit (PDU) session of a wireless device, wherein the registration request identifies a first set of session management functions that includes SMF1; storing a record for the first context of the PDU session; receiving, at a second time after the first time, at the network function implemented using the hardware platform, a second registration request from a second session management function (SMF2) to register a second context of the PDU session of the wireless device, wherein the registration request identifies a second set of session management functions that includes SMF2; and updating the record for the PDU session by replacing an identifier of the first set with an identifier of the second set.

In yet another example aspect, a method of digital communication is disclosed. The method includes receiving, at a network-side function operating in a communication network, a deregistration request from a session management function to deregister a context of the PDU session of a wireless device, wherein the deregistration request identifies a set of session management functions that includes the session management function; determining an action to perform in response to the deregistration request, wherein the action is one of: (a) accepting the deregistration request and deregistering the context in case that the context was registered due to a registration request received from the session management function, or (b) accepting the deregistration request and deregistering the context in case that the context was registered due to a registration request received from another session management function included in the set of session management functions, or (c) processing the deregistration request based on a rule; and communicating a result of the action in a deregistration response message to the session management function.

In yet another example aspect, a method of digital communication is disclosed. The method includes transmitting, at a first time, by a wireless device operating in a first public land mobile network (PLMN), a request for establishing a multi-access protocol data unit (MA-PDU) session with a Home PLMN via the first PLMN, the MA-PDU thus being successfully established; transmitting, at a second time after the first time, with the wireless device operating in a second PLMN, a second request for establishing the MA-PDU session with the Home PLMN via the second PLMN; receiving a response to the second request; determining that the response is a non-confirmation to establishment of the MA-PDU session via the second PLMN; and performing a communication, due to the determining, to release the MA-PDU session that was previously established with the Home PLMN via the first PLMN.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, features are described in the present document.

DETAILED DESCRIPTION

Figure 1A:
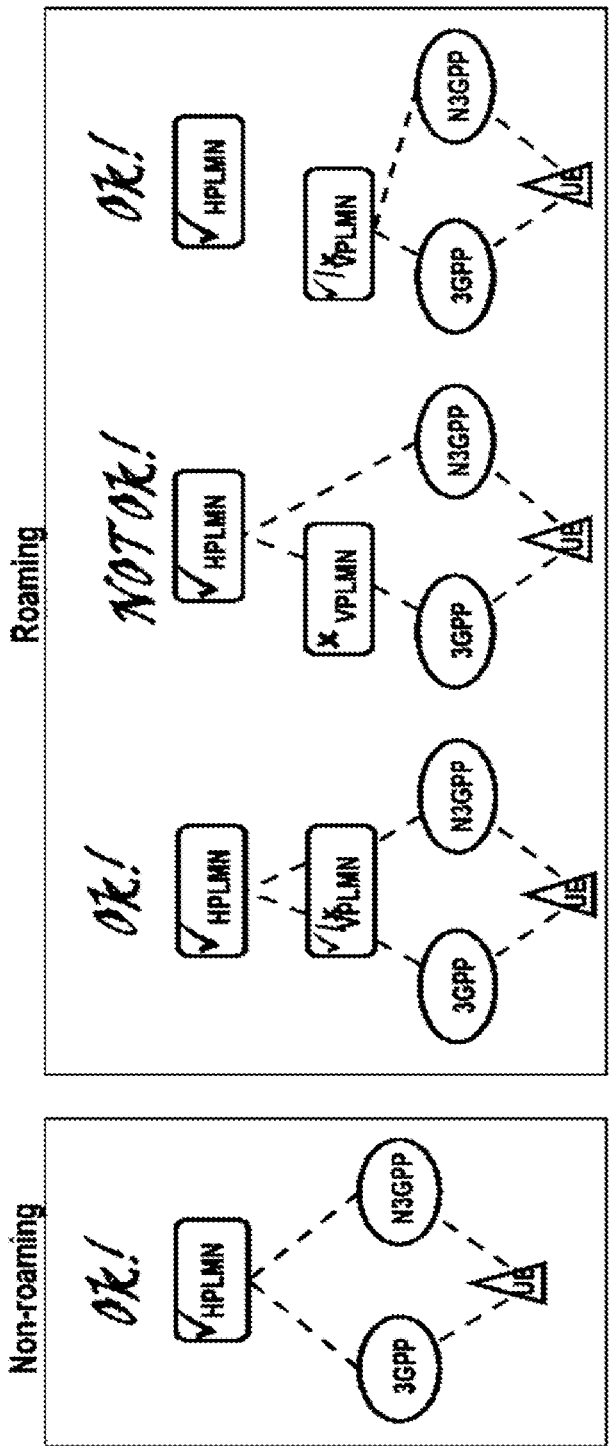
FIG. 1A is an example scenario in which multi-access PDU sessions may cause operational problems.

Section headings are used in the present document for ease of understanding and do not limit the techniques described in each section only to embodiments based on that section. Furthermore, certain examples described in the document use 3GPP protocol terminology, but the applicability of these techniques is not limited to 3GPP or 5G technologies.

1. Technical Problem #1, for SMF Set Scenario

In 5G system, when PDU Session is established, the selected Session Management Function (SMF) will send SMF Registration request to the Unified Data Management (UDM). And when PDU session is released, the SMF will send SMF Deregistration request to the UDM. If accepting the SMF Registration request, the UDM stores the SMF Registration Context which consists of PDU Session ID, SMF Instance ID, DNN etc. The SMF Registration Context stored in UDM is indexed by PDU Session ID.

It depends on UDM pre-configured internal logic to accept or to reject the SMF Deregistration Request from the SMF other than the one who previously initiates SMF Registration. With the introduction of SMF set (as described in 3GPP TS 23.501 specification, clause 5.21.3.2, and below), the existing logic within the UDM needs to be enhanced to support this new concept.

SMF Set as defined in 3GPP TS 23.501 specification, clause 5.21.3.2 is a group of equivalent SMFs, within which each SMF is interchangeable because they share the same context data and control the same User Plane Function (UPF). Requests from any SMF of same SMF Set shall be regarded as equivalent, e.g. the SMF Deregistration Request from any SMF within the same SMF set of the SMF in the SMF Registration Context shall be treated as legitimate by the UDM to de-register the SMF Registration Context from the UDM.

In order to support the new functionality above, the UDM needs to be aware of the SMF Set of which the Requesting SMF is belonged.

2. Technical Problem #2, for Multi-Access PDU Scenario 5G system allows a single PDU session to be established over multiple accesses, i.e. via both 3GPP access and Non-3GPP access, of which the PDU session is referred Multi-access PDU (MA PDU) session. For example, in the current version of 3GPP TS 23.501, clause 3.1, the term MA PDU session is defined as a PDU Session that provides a PDU connectivity service, which can use one access network at a time, or simultaneously one 3GPP access network and one non-3GPP access network. By contrast, a single access PDU (SA-PDU) session may be a session that is similar to the currently used PDU sessions in 3GPP networks.

When establishing MA-PDU session, UE is not required to first register with 5G Core Network for both accesses and to initiate the PDU session establishment at the same time. In home-routed roaming case, the 3GPP access and Non-3GPP access of the UE could be served by two different PLMNs, e.g. HPLMN and VPLMN. When the UE first registers with HPLMN directly via its Non-3GPP access, and then establishes a MA-PDU session successfully over its Non-3GPP access. Subsequently, the UE registers with VPLMN via 3GPP access and request establishment of MA-PDU session over the 3GPP access.

The existing MA-PDU session establishment procedure works well if both HPLMN and VPLMN support MA-PDU session.

However, when only the HPLMN supports MA-PDU session while the VPLMN does not support such feature (see figure below), the existing procedure could not ensure HPLMN to recognize the inconsistent PDU type for the PDU session on the two accesses of the UE during SMF Registration/Deregistration to the UDM. As a result, the SMF Registration context could be corrupted with incorrect binding between the PDU session and its hosting SMF/SMF set.

Figure 1B:
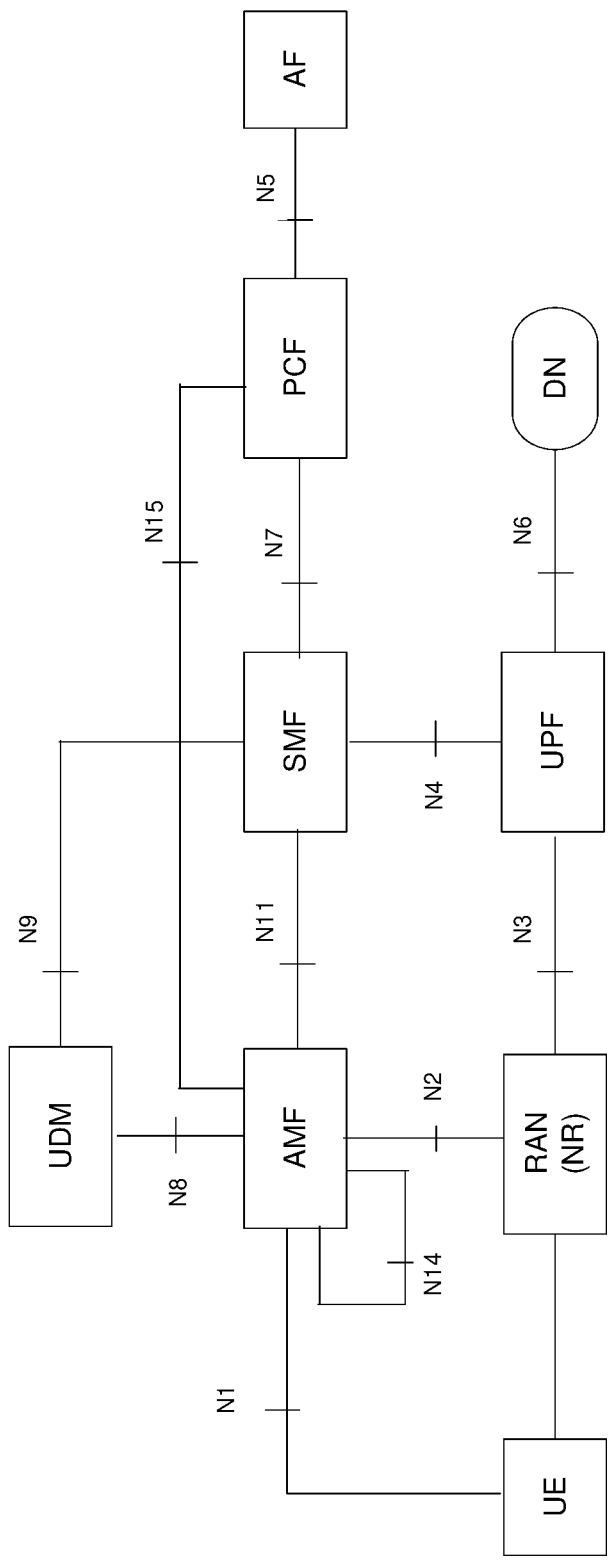
FIG. 1B shows an example network-side implementation to support 5G network operation.

FIG. 1B shows the architecture of 5G system. In this architecture, there are the following network functions:

UE, User Equipment.

RAN, Radio Access Network. In 5G, it is NR base station.

AMF, Access and Mobility Management function. This function includes the following functionalities: Registration management, Connection management, Reachability management and Mobility Management. This function also performs the access authentication and access authorization. The AMF is the NAS security termination and relay the SM NAS between UE and SMF, etc.

SMF, Session Management Function: This function includes the following functionalities: session establishment, modification and release, UE IP address allocation & management (including optional authorization functions), selection and control of UP function, downlink data notification, etc. The SMF controls the UPF via N4 association.

UPF, User plane function. This function includes the following functionalities: serving as an anchor point for intra-/inter-radio access technology (RAT) mobility, packet routing & forwarding, traffic usage reporting, QoS handling for the user plane, downlink packet buffering and downlink data notification triggering, etc. UPF may be deployed as I-UPF (Intermediate UPF) or PDU Session Anchor (PSA). PSA/UPF is the UPF terminating the N6 interface towards the data network. The I-UPF provides traffic forwarding between the RAN and PSA/UPF. The I-UPF may support "ULCL" (Uplink classifier: offloading uplink traffic based on target IP address) or "BP" (Branching point: offloading uplink traffic based on source IP address) to offload some traffic to local PSA/UPF.

PCF, Policy Control Function. The PCF provides QoS policy rules to control plane functions to enforce the rules. The PCF(s) transform(s) the AF requests into policies that apply to PDU Sessions. The PCF provide the AF influenced Traffic Steering Enforcement Control in PCC rules to SMF so the SMF can establish the data path to offload the traffic to local data network.

AF, Application Function. The AF interacts with the 3GPP Core Network in order to provide services, for example to support application influence on traffic routing. Based on operator deployment, Application Functions considered to be trusted by the operator can be allowed to interact directly with relevant Network Functions. Application Functions not allowed by the operator to access directly the Network Functions shall use the external exposure framework via the NEF to interact with relevant Network Functions.

In order to obtain the IP service, PDU session is established upon UE request.

Figure 2:
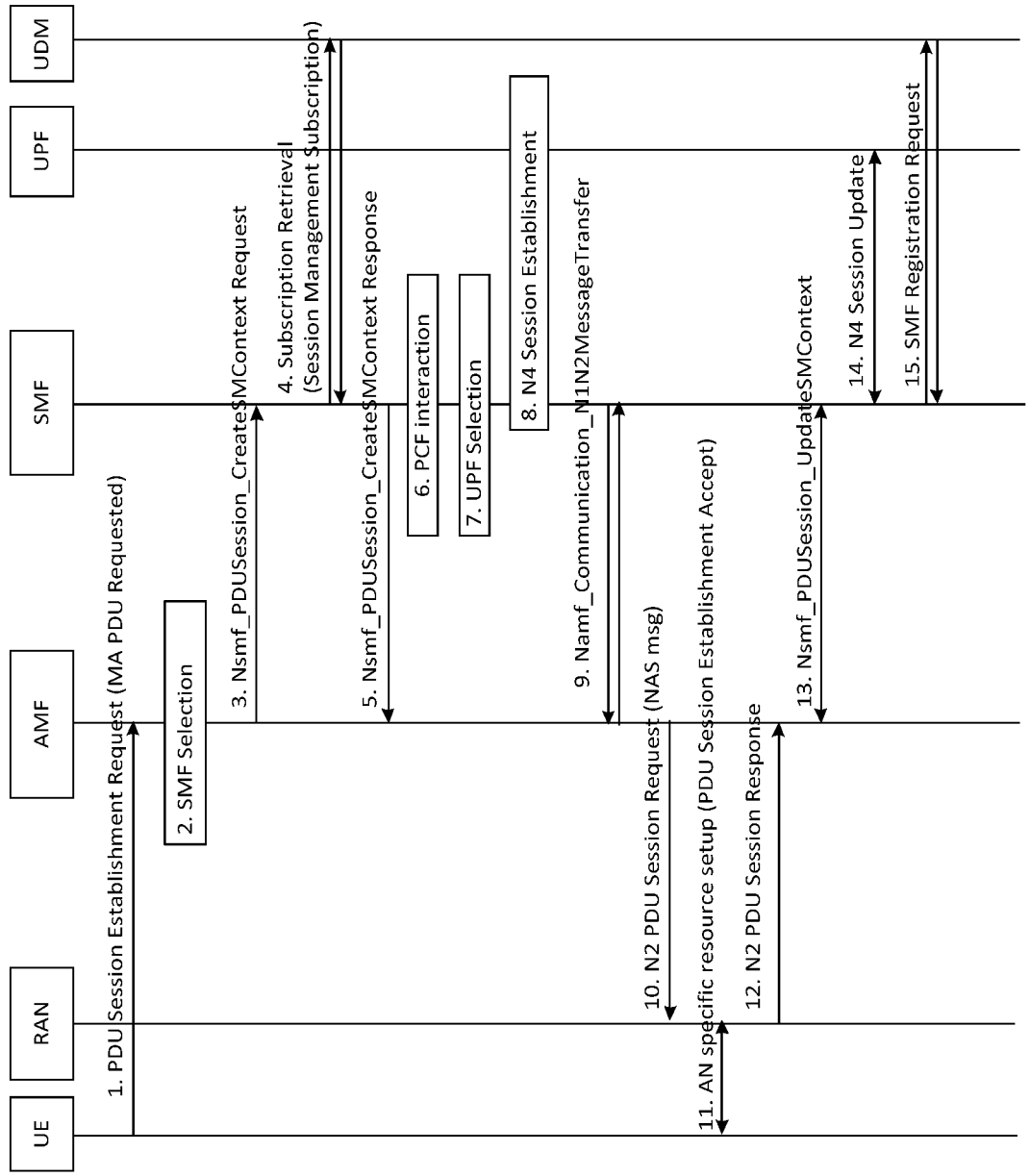
FIG. 2 shows an example of a PDU session establishment procedure

FIG. 2 shows an example of messages exchanged during the PDU session establishment procedure.

UE registers to 5G. The UE may perform Registration procedure either via 3GPP access or via Non-3GPP access. If the UE registration is accepted, the AMF performs AMF Registration to the UDM. The UDM stores the AMF Registration Context, after accepting the AMF Registration request.

1. From UE to AMF: NAS Message (DNN, PDU Session ID, N1 SM container (PDU Session Establishment Request)). In order to establish a new PDU Session, the UE generates a new PDU Session ID. The UE initiates the request for PDU Session Establishment procedure by the transmission of a NAS message containing a PDU Session Establishment Request within the N1 SM container. The NAS message sent by the UE is encapsulated by the AN in a N2 message towards the AMF 2. The AMF selects an SMF based on the requested DNN and other information.

3. The AMF sends Nsmf_PDUSession_CreateSMContext Request (SUPI, DNN, PDU Session ID, AMF ID, N1 SM container (PDU Session Establishment Request). SUPI (Subscription Permanent Identifier) uniquely identify the UE subscription. The AMF ID is the UE's GUAMI (Globally Unique AMF ID) which uniquely identifies the AMF serving the UE. The AMF forwards the PDU Session ID together with the N1 SM container containing the PDU Session Establishment Request received from the UE.

4. The SMF sends Nudm_SDM_Get Request to the UDM, to retrieve Session Management Subscription data. The UDM sends back the requested data in response message.

5. If the SMF is able to process the PDU Session establishment request, the SMF creates an SM context and responds to the AMF by providing an SM Context Identifier in Nsmf_PDUSession_CreateSMContext Response.

6. The SMF may interact with PCF to perform PCC authorization.

7. The SMF selects a UPF based on the DNN and other information.

8. The SMF sends an N4 Session Establishment Request to the UPF to setup N4 session. The SMF provides Packet detection, enforcement and reporting rules to be installed on the UPF for this PDU Session. If CN Tunnel Info is allocated by the SMF, the CN Tunnel Info is provided to UPF in this step. The UPF acknowledges by sending an N4 Session Establishment Response. If CN Tunnel Info is allocated by the UPF, the CN Tunnel Info is provided to SMF in this step.

9. SMF to AMF: Namf_Communication_N1N2MessageTransfer (PDU Session ID, N2 SM information (PDU Session ID, QFI(s), QoS Profile(s), N3 CN Tunnel Info), N1 SM container (PDU Session Establishment Accept)). The N2 SM information carries information that the AMF shall forward to the (R)AN which includes the N3 CN Tunnel Info corresponds to the Core Network address of the N3 tunnel corresponding to the PDU Session, the QoS profiles and the corresponding QFI (QoS Flow Identifier) and the PDU Session ID. The N1 SM container contains the PDU Session Establishment Accept that the AMF shall provide to the UE.

10. AMF to RAN: N2 PDU Session Request (N2 SM information, NAS message (PDU Session ID, N1 SM container (PDU Session Establishment Accept))). The AMF sends the NAS message containing PDU Session ID and PDU Session Establishment Accept targeted to the UE and the N2 SM information received from the SMF within the N2 PDU Session Request to the 5G-AN.

11. RAN to UE: The RAN may issue AN specific signaling exchange with the UE that is related with the information received from SMF. For example, in case of a 3GPP RAN, an RRC Connection Reconfiguration may take place with the UE establishing the necessary RAN resources related to the QoS Rules for the PDU Session request. RAN forwards the NAS message (PDU Session ID, N1 SM container (PDU Session Establishment Accept)) to the UE. RAN also allocates AN N3 tunnel information for the PDU Session.

12. RAN to AMF: N2 PDU Session Response (PDU Session ID, Cause, N2 SM information (PDU Session ID, AN Tunnel Info, List of accepted/rejected QFI(s))).

The AN Tunnel Info corresponds to the Access Network address of the N3 tunnel corresponding to the PDU Session.

13. AMF to SMF: Nsmf_PDUSession_UpdateSMContext Request (N2 SM information).

The AMF forwards the N2 SM information received from (R)AN to the SMF. If the list of rejected QFI(s) is included in N2 SM information, the SMF shall release the rejected QFI(s) associated QoS profiles.

14. The SMF initiates an N4 Session Modification procedure with the PSA/UPF0. The SMF provides AN Tunnel Info to the PSA/UPF0 as well as the corresponding forwarding rules.

15. SMF to UDM: Nudm_UECM_Registration Request (PDU Session ID, SMF Instance ID, DNN, PLMN ID).

If UDM accepts SMF Registration, it stores the SMF Registration Context and sends response message to the SMF.

After the PDU session establishment, the UE is allocated with IP address. With the allocated IP address, UE can start IP communication with any other IP remote side.

When the PDU session is no longer needed, the UE may request to release the PDU session. After PDU session is successfully released, the SMF sends SMF Deregistration request to the UDM, including the PDU Session ID. The UDM uses the PDU Session ID to locate the stored SMF Registration Context, and removes the stored SMF Registration Context associated with the PDU Session ID, if the SMF Deregistration request is acceptable.

3. Example 1 of a Technical Problem Solved by Disclosed Embodiments

When the above PDU session establishment/release procedure applies to the SMF Set case, due to lack of sufficient information of SMF Set, the UDM might reject the requests initiated by another SMF even though it is belonged to the same SMF Set as the SMF stored in SMF Registration Context. As part of the functionality of the SMF set, request from any SMF within the same SMF Set shall be regarded as equivalent and shall be accepted.

4. Example 2 of a Technical Problem Solved by Disclosed Embodiments

In the Home-Routed roaming case, when the 3GPP and Non-3GPP accesses of the UE are served by different PLMNs, however, the HPLMN supports MA PDU session while the VPLMN does not, the SMF Registration/Deregistration Request, as the result of MA PDU Session Establishment and Release procedures, respectively, could corrupt the binding information of the PDU Session and the hosting SMF in the SMF Registration context in the UDM.

Figure 3:
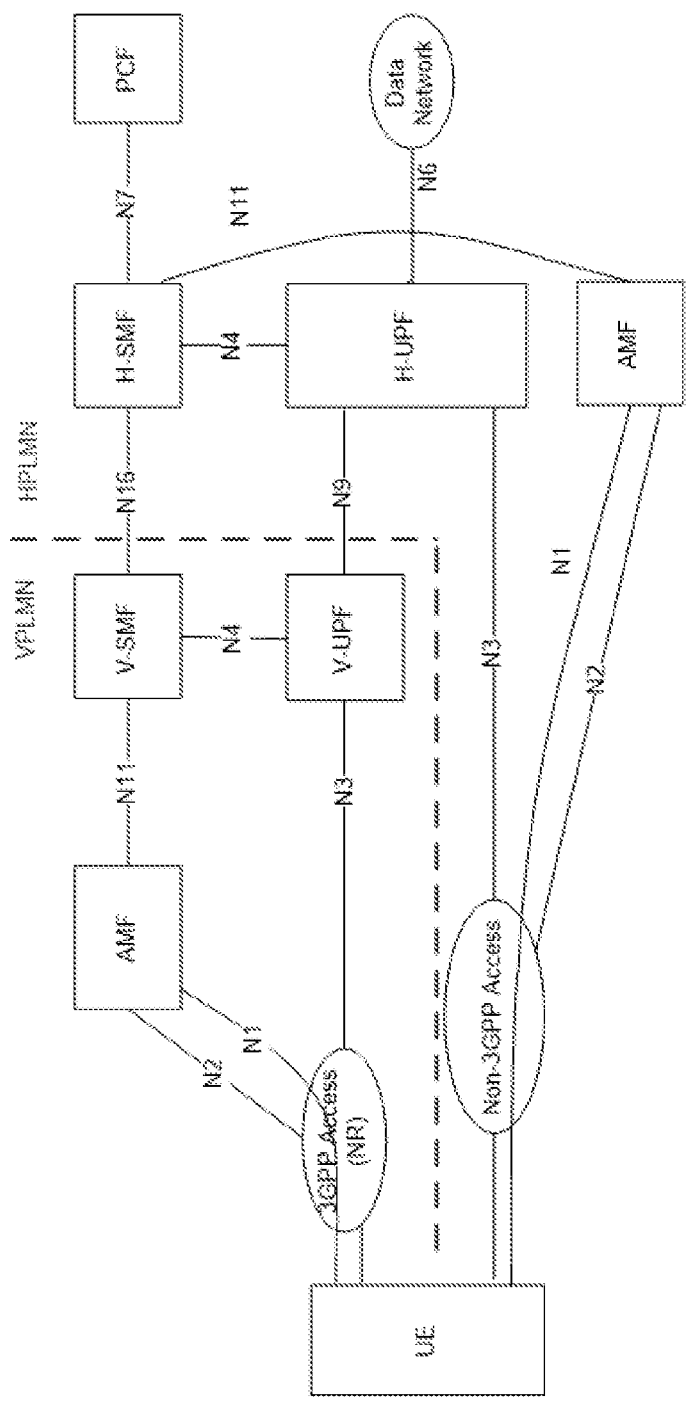
FIG. 3 shows an example of a home-Routed Roaming Architecture for supporting multi-access PDU MA-PDU session.

FIG. 3 shows the 5G architecture of supporting MA-PDU session in Home-Routed roaming scenario.

Figure 4:
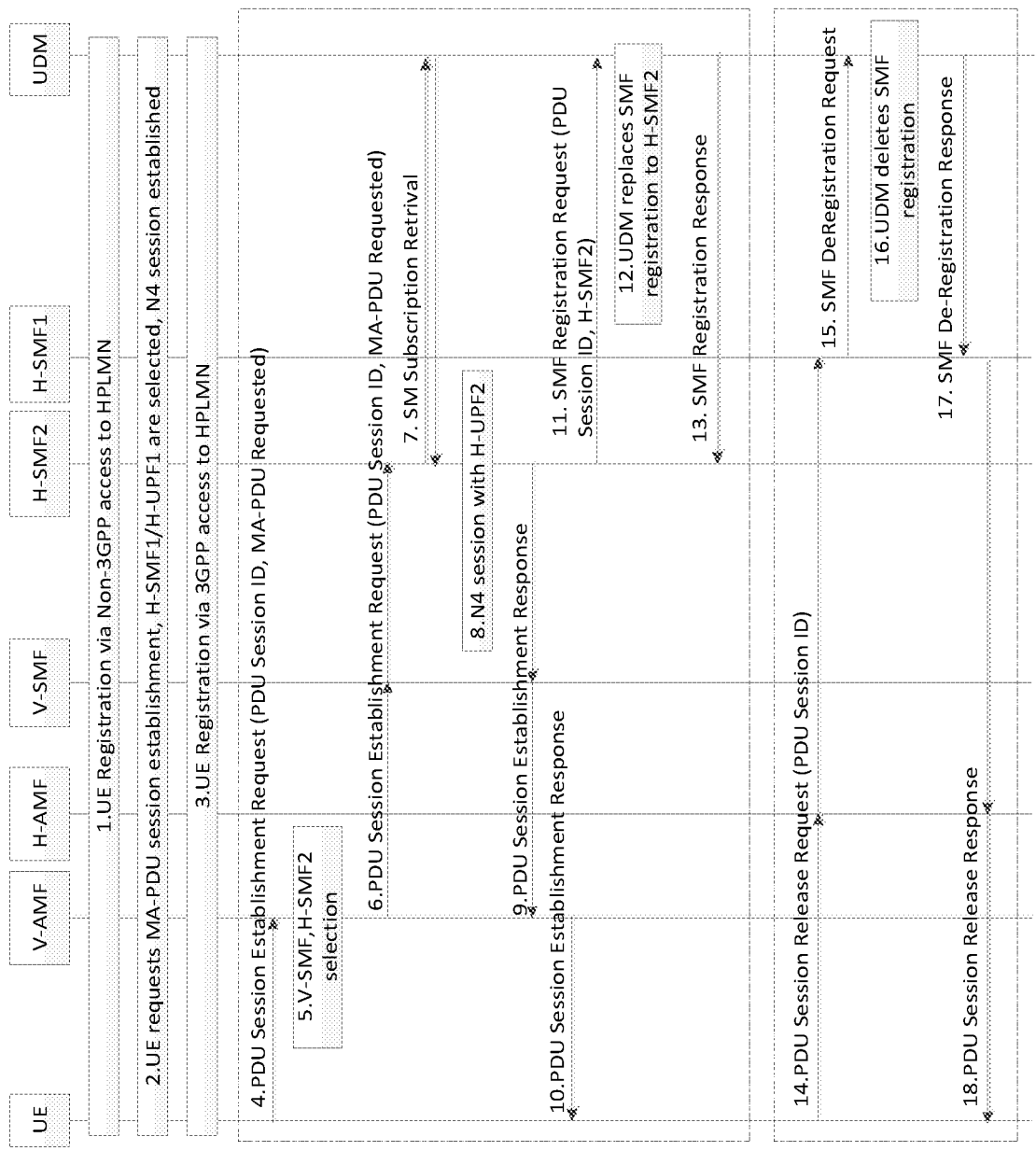
FIG. 4 shows an example of MA-PDU session establishment and release operation.

FIG. 4 describes the conflict of SMF Registration/Deregistration to UDM during MA-PDU session establishment procedure, in Home-Routed roaming scenario.

The following procedure is based on the scenario when the UE requests the MA-PDU session via 3GPP access and Non-3GPP access separately. In this scenario, the UE firstly registers to HPLMN via Non-3GPP access, and then it requests the establishment of one leg for the MA-PDU session. Later on, the UE registers to VPLMN via 3GPP access, and requests the establishment of the second leg for MA-PDU session.

1. The UE firstly registers to HPLMN via Non-3GPP access. H-AMF performs AMF Registration to the UDM, and the UDM stores the AMF Registration Context.

2. The UE requests MA-PDU session establishment to the H-AMF.

The UE initiates PDU Session Establishment Request (PDU Session ID, DNN, MA-PDU Requested indication, N1 SM container (PDU Session Establishment Request)) to the H-AMF.

The MA-PDU Requested indication identifies that the requested PDU session is MA-PDU session, not Single Access PDU (SA-PDU) session.

The H-AMF selects proper H-SMF (i.e. H-SMF1) based on DNN, and other information. The selected H-SMF1 shall support MA-PDU session.

The H-AMF sends Nsmf_PDUSession_CreateSMContext Request (SUPI, DNN, PDU Session ID, AMF ID, N1 SM container (PDU Session Establishment Request), MA-PDU Requested indication) to the H-SMF1, to request establishment of MA-PDU session. The H-SMF1 selects H-UPF1 supporting MA-PDU session, and sets up the N4 session for the MA-PDU session, and sends response message to the V-AMF.

If MA-PDU session is successfully established, the H-AMF sends PDU Session Establishment response to the UE, with "MA-PDU Accepted indication". The "MA-PDU Accepted indication" is used to identify the PDU session is successfully established as MA-PDU session.

If MA-PDU session is successfully established, the H-SMF1 sends SMF Registration to the UDM. The UDM stores the SMF Registration Context, within which the SMF Instance ID pointing to the H-SMF1.

3. Later on, the UE registers to VPLMN via 3GPP access.

4. The UE initiates MA-PDU session establishment request to the V-AMF, carrying the existing PDU Session ID, "MA-PDU Requested indication", as stated in step 2.

5. Due to the VPLMN doesn't support MA-PDU session, the V-AMF interprets the MA-PDU session establishment request to an "Initial" PDU Session Establishment Request. Hence, the V-AMF will select V-SMF and new H-SMF (i.e. H-SMF2) based on DNN and other information.

6. The V-AMF sends Nsmf_PDUSession_CreateSMContext Request (SUPI, DNN, PDU Session ID, AMF ID, N1 SM container (PDU Session Establishment Request)) to the V-SMF.

As the V-AMF doesn't support MA-PDU session, the "MA-PDU Requested indication" from the UE is discarded by the V-AMF.

The V-SMF initiates Nsmf_PDUSession_Create Request (SUPI, DNN, PDU Session ID, N1 SM container (PDU Session Establishment Request)) to the H-SMF2.

7. The H-SMF2 retrieves Session Management subscription data from the UDM.

8. The H-SMF2 selects the H-UPF2 and sets up N4 session for the MA-PDU session.

9. H-SMF2 sends Nsmf_PDUSession_Create response to the V-SMF. The V-SMF sends Nsmf_PDUSession_CreateSMContext response to the V-AMF.

10. The V-AMF sends PDU Session Establishment Response to the UE, and sends AN message to the RAN to setup AN specific resources, as FIG. 2 described.

Due to the V-AMF/V-SMF doesn't support MA-PDU session, the requested MA-PDU session is established as Single Access PDU (SA-PDU) session.

11. After the PDU Session established, the H-SMF2 sends SMF Registration Request to UDM, by invoking Nudm_UECM_Registration Request (PDU Session ID, DNN, SMF Instance ID, PLMN ID). The SMF Instance ID shall be present and contain the NF Instance ID of H-SMF2.

12. The UDM accepts SMF Registration request, and updates the stored SMF Registration Context with new information from H-SMF2. That is, the UDM replaces the SMF Instance ID in existing SMF Registration Context to NF Instance ID of H-SMF2.

13. The UDM sends SMF Registration response to the H-SMF2.

After the UE receives the PDU Session Establishment response from V-AMF, it recognizes that there is no MA-PDU related information included and hence, it understands that the MA PDU Session over its two accesses is not feasible. Furthermore, SA-PDU session and MA-PDU session over the 3GPP and Non-3GPP accesses, respectively, cannot share the "same" PDU Session ID. As a result, UE may decide to keep the single access PDU session over the second leg (i.e. over the Non-3GPP access) and initiates PDU session release procedure to remove the first leg of MA-PDU session (i.e. over the 3GPP access), i.e. trigger the H-SMF1 to release the MA-PDU Session.

14. The UE initiates PDU Session Release Request (PDU Session ID) to the H-AMF, to request release of MA-PDU leg in Non-3GPP side.

15. The PDU Session Release procedure will cause the H-SMF1 sends SMF Deregistration to the UDM, carrying the PDU Session ID.

16. Upon receiving the SMF Deregistration from the H-SMF1, the UDM finds SMF Registration Context associated with the PDU Session ID, and removes the SMF Registration Context from the UDM.

The removed SMF Registration Context is actually associated with the H-SMF2. So this step actually removes the SMF Registration from H-SMF2.

17. The UDM sends SMF Deregistration response to the H-SMF1.

18. The H-SMF1 release the resources of the MA-PDU session, and sends PDU Session Release Response to the UE.

Figure 5:
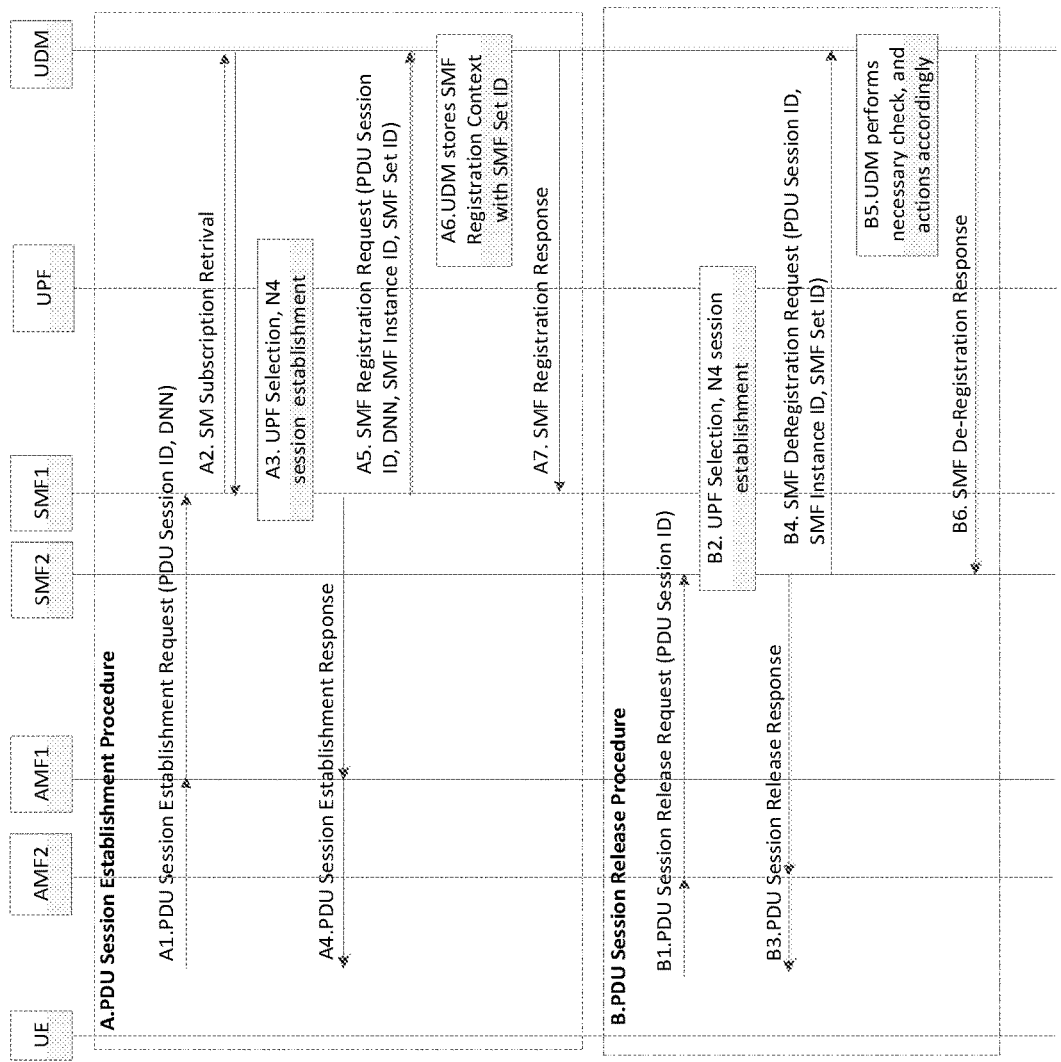
FIG. 5 shows an example of a session management function (SMF) Registration and Deregistration process with the unified data management (UDM) network function.

As described in the FIG. 5, the UE initiated PDU session release from step 14 to step 18 would result that the SMF Registration Context in the UDM for that PDU session is no longer available even though only the MA-PDU session over the Non-3GPP access is released and the SA-PDU session over the 3GPP access is still established. Any subsequent UDM initiated interaction with H-SMF2 will not work, e.g. Notification of SM subscription changes, subscribes specific events from SMF, collects statistic info (e.g. trace info) from SMF.

5. Example Solution 1 to Technical Problem #1 that Includes an SMF Set

FIG. 5 describes the enhancement to SMF Registration/Deregistration procedure. By including the SMF Set ID in the SMF Registration/Deregistration request, the UDM can store the SMF Set ID in the SMF Registration Context, and compare it with the subsequent request from any other SMF.

Step A1 to A7 illustrates the PDU Session Establishment procedure in high-level description, within which the SMF Registration procedure to UDM is enhanced. Step B1 to B7 illustrates the PDU Session Release procedure in high-level description, within which the SMF Deregistration procedure to UDM is enhanced.

The SMF Deregistration procedure might be initiated by different SMF (namely SMF2) other than the one (namely SMF1) who initiated SMF Registration.

A1. The UE sends PDU Session Establishment Request to the AMF1, carrying the PDU Session ID, DNN, and other information. The AMF1 triggers the SMF1 to establish the PDU session as required.

A2. The SMF1 retrieves Session Management subscription data from the UDM.

A3. The SMF1 selects UPF based on DNN and other necessary information, and sets up N4 session to the selected UPF.

A4. The SMF1 sends PDU Session Establishment response to the UE.

A5. After the PDU Session established, the SMF1 sends SMF Registration Request to UDM, by invoking Nudm_UECM_Registration Request (PDU Session ID, DNN, SMF Instance ID, optionally SMF Set ID).

The SMF Instance ID contains the NF Instance ID of SMF1. If the requesting SMF belongs to a SMF Set, the SMF Set ID shall be present and contain the SMF Set ID of SMF1.

A6. The UDM accepts SMF Registration request, and stores the SMF Registration Context. The SMF Registration Context consists of PDU Session ID, DNN, SMF Instance ID, and SMF Set ID (if available).

A7. The UDM sends SMF Registration response to the SMF1.

After the PDU session has been established, the UE might register to another AMF and requests PDU session update procedure. If previous SMF cannot serve the new area, new SMF should be selected. The new SMF shall perform SMF Registration to UDM as described in step A5 to A7.

In some specific cases, e.g. Multi-Access PDU session establishment and release, the PDU session release request may be handled by another SMF which is not the same as the one stored in SMF Registration Context in UDM.

B1. The UE sends PDU Session Release Request (PDU Session ID) to the AMF2. The AMF2 requests SMF2 to release the PDU session.

B2. The SMF2 release the resources of the PDU session, e.g. N4 session.

B3. The SMF2 sends PDU Session Release Response to the UE.

B4. After release resources of the PDU session, the SMF2 sends SMF Deregistration request to the UDM, by invoking Nudm_UECM_Deregistration (PDU Session ID, SMF Instance ID, SMF Set ID).

The SMF Instance ID present in the SMF Deregistration shall contain the NF Instance ID of the SMF2. If available, the SMF Set ID shall be included and carry the SMF Set ID of SMF2.

B5. Upon receiving the SMF Deregistration from the SMF2, the UDM recognizes the SMF Registration Context associated with the PDU Session ID, and determines the UDM action e.g. based on operator policy, and/or UE subscription data.

The UDM might perform one of the following actions:

(i) If the SMF Deregistration Request contains the SMF Instance ID with the same value as the SMF Instance ID in the stored SMF Registration Context associated with the PDU Session ID, the UDM accepts the SMF Deregistration and removes the stored SMF Registration Context; or, (ii) If the SMF Deregistration Request contains the SMF Set ID with the same value as the SMF Set ID in the stored SMF Registration Context associated with the PDU Session ID, the UDM accepts the SMF Deregistration and removes the stored SMF Registration Context; or, (iii) If neither the SMF Instance ID nor the SMF Set ID is the same as the corresponding one in the stored SMF Registration Context associated with the PDU Session ID, the UDM may:

a) Accept the SMF Deregistration Request, but not remove stored SMF Registration Context; or, b) Reject the SMF Deregistration Request, with appropriate Reject Cause.

For bullet iii, whether the UDM accepts the SMF Deregistration Request with non-removing stored SMF Registration Context, or reject the SMF Deregistration Request might be service specific, e.g. for MA-PDU session service, the UDM choose method a).

B6. The UDM sends SMF Deregistration response to the SMF2.

6. Example Solution 2 to Technical Problem #2, Including MA-PDU Session

Figure 6:
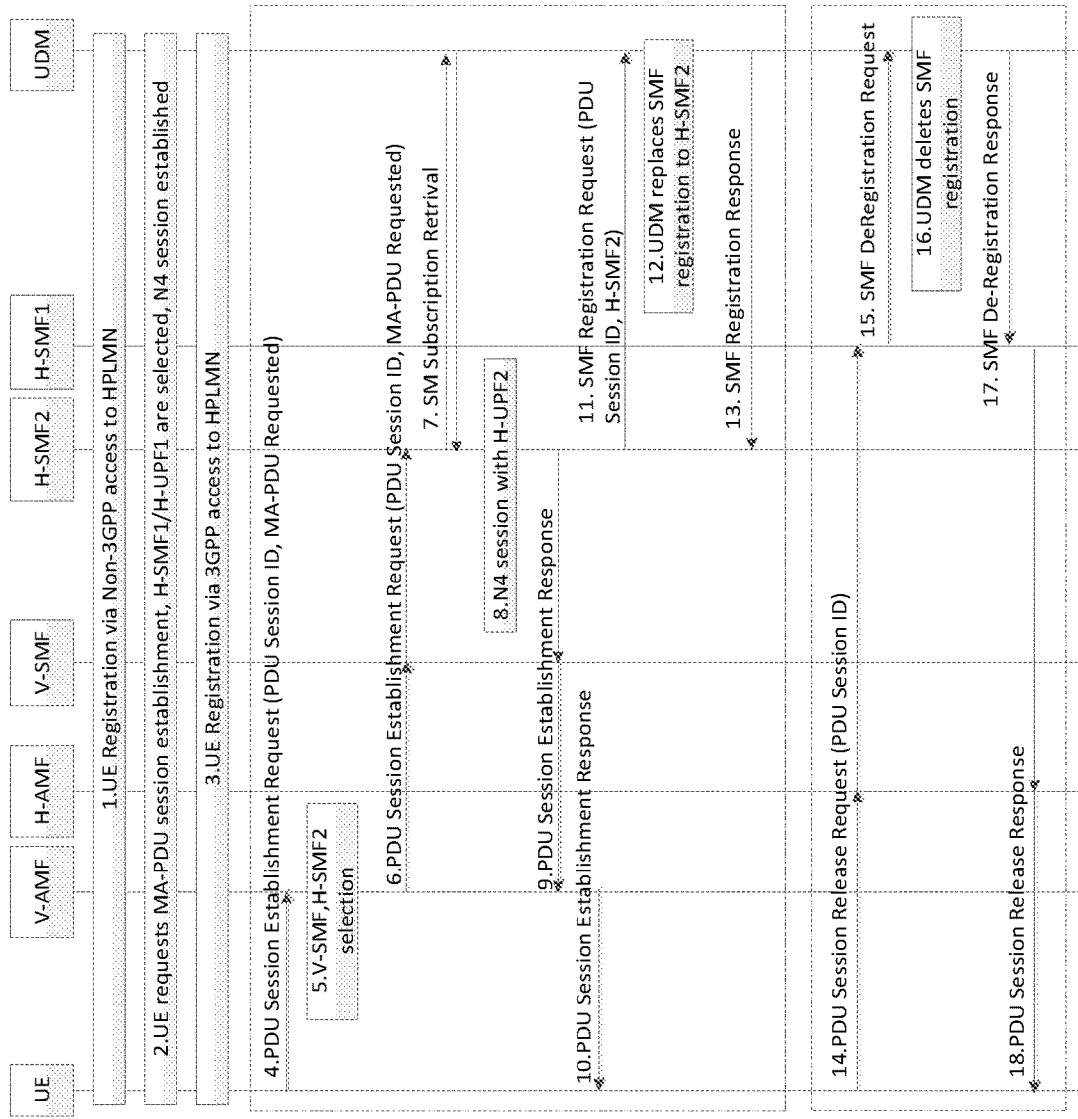
FIG. 6 shows an example of a MA-PDU session establishment in Home-Routed roaming scenario.

FIG. 6 describes the solution to solve the problem in MA-PDU session establishment procedure, especially applied to Home-Routed roaming scenario where HPLMN supports MA-PDU session while VPLMN doesn't support.

The procedure assumes the UE requests MA-PDU session via 3GPP access and Non-3GPP access separately. For example, the UE firstly registers to HPLMN via Non-3GPP access, and request establishment of one leg for the MA-PDU session. Later on, the UE registers to VPLMN via 3GPP access, and request establishment of the second leg for MA-PDU session.

1. The UE firstly registers to HPLMN via Non-3GPP access. H-AMF performs AMF Registration to the UDM, and the UDM stores the AMF Registration Context.

2. The UE requests MA-PDU session establishment to the H-AMF.

The UE sends PDU Session Establishment Request (PDU Session ID, DNN, MA-PDU Requested indication, N1 SM container (PDU Session Establishment Request)) to the H-AMF.

The MA-PDU Requested indication identifies that the requested PDU session is MA-PDU session, not Single-Access PDU session.

The H-AMF selects proper H-SMF (i.e. H-SMF1) based on DNN, and other information. The selected H-SMF1 shall support MA-PDU session.

The H-AMF sends Nsmf_PDUSession_CreateSMContext Request (SUPI, DNN, PDU Session ID, AMF ID, N1 SM container (PDU Session Establishment Request), MA-PDU Requested indication) to the H-SMF1, to request establishment of MA-PDU session. The H-SMF1 selects H-UPF1 supporting MA-PDU session, and sets up the N4 session for the MA-PDU session, and sends response message to the V-AMF.

If MA-PDU session is successfully established, the H-AMF sends PDU Session Establishment response to the UE, with "MA-PDU Accepted indication". The "MA-PDU Accepted indication" is used to identify the PDU session is successfully established as MA-PDU session.

After MA-PDU session is successfully established, the H-SMF1 sends SMF Registration Request (PDU Session ID, DNN, SMF Instance ID, optionally SMF Set ID) to the UDM. The SMF Instance ID shall be included and contain the NF Instance ID of H-SMF1. The SMF Set ID shall be present if available, and if present shall contain the SMF Set ID of H-SMF1. The UDM stores the SMF Registration Context which consists of PDU Session ID, DNN, SMF Instance ID, and SMF Set ID.

3. Later on, the UE registers to VPLMN via 3GPP access.

4. The UE sends MA-PDU session establishment request to the V-AMF, carrying the existing PDU Session ID, "MA-PDU Requested indication", as stated in step 2.

5. Due to the VPLMN doesn't support MA-PDU session, the V-AMF interprets the MA-PDU session establishment request to an Initial PDU Session Establishment Request. Hence, the V-AMF will select V-SMF and new H-SMF (i.e. H-SMF2) based on DNN and other information.

6. The V-AMF sends Nsmf_PDUSession_CreateSMContext Request (SUPI, DNN, PDU Session ID, AMF ID, N1 SM container (PDU Session Establishment Request)) to the V-SMF.

As the V-AMF doesn't support MA-PDU session, the "MA-PDU Requested indication" from the UE is discarded by the V-AMF.

The V-SMF sends Nsmf_PDUSession_Create Request (SUPI, DNN, PDU Session ID, N1 SM container (PDU Session Establishment Request)) to the H-SMF2.

7. The H-SMF2 retrieves Session Management subscription data from the UDM.

8. The H-SMF2 selects the H-UPF2 (user plane function) and sets up N4 session for the MA-PDU session.

9. H-SMF2 sends Nsmf_PDUSession_Create response to the V-SMF. The V-SMF sends Nsmf_PDUSession_CreateSMContext response to the V-AMF.

10. The V-AMF sends PDU Session Establishment Response to the UE, and sends AN message to the RAN to setup AN specific resources, as FIG. 2 described.

Due to the V-AMF/V-SMF doesn't support MA-PDU, the requested MA-PDU session is established as SA-PDU.

11. After the PDU Session established, the H-SMF2 sends SMF Registration Request to UDM, by invoking Nudm_UECM_Registration Request (PDU Session ID, DNN, SMF Instance ID, SMF Set ID). The SMF Instance ID is present and may contain the NF Instance ID of H-SMF2. The SMF Set ID shall be included, if available, and if present shall contain the SMF Set ID of H-SMF2.

12. The UDM accepts SMF Registration request, and updates the stored SMF Registration Context with new information from H-SMF2. That is, the UDM replaces the SMF Instance ID in existing SMF Registration Context to NF Instance ID of H-SMF2, and replaces the SMF Set ID, if available, in existing SMF Registration Context to SMF Set ID of H-SMF2.

For MA-PDU session service, it assumes the UDM accepts the SMF Registration Request from other SMF which is not the same one as the stored SMF Registration Context, even if the two SMFs belong to different SMF Set.

13. The UDM sends SMF Registration response to the H-SMF2.

After the UE receives the PDU Session Establishment response from V-AMF, it may check there is no MA-PDU related information included. Hence, it may initiates PDU session release procedure to the first leg of MA-PDU session, i.e. trigger the H-SMF1 to release the MA-PDU Session.

14. The UE sends PDU Session Release Request (PDU Session ID) to the H-AMF, to request release of MA-PDU leg in Non-3GPP side.

15. The PDU Session Release procedure will cause the H-SMF1 sends SMF Deregistration to the UDM, carrying the PDU Session ID.

The H-SMF1 invokes Nudm_UECM_Deregistration (PDU Session ID, SMF Instance ID, optionally SMF Set ID) to UDM. The SMF Instance ID included contains the NF Instance ID of H-SMF1. If available, the SMF Set ID shall be present and if present carry the SMF Set ID of H-SMF1.

16. On receiving the SMF Deregistration from the H-SMF1, the UDM finds SMF Registration Context associated with the PDU Session ID, and determines the UDM action e.g. based on operator policy, and/or UE subscription data.

The UDM might perform one of the following actions:

(i) If the SMF Deregistration Request contains the SMF Instance ID with the same value as the SMF Instance ID in the stored SMF Registration Context associated with the PDU Session ID, the UDM accepts the SMF Deregistration and removes the stored SMF Registration Context; or, (ii) If the SMF Deregistration Request contains the SMF Set ID with the same value as the SMF Set ID in the stored SMF Registration Context associated with the PDU Session ID, the UDM accepts the SMF Deregistration and removes the stored SMF Registration Context; or, (iii) If neither the SMF Instance ID nor the SMF Set ID is the same as the corresponding one in the stored SMF Registration Context associated with the PDU Session ID, the UDM further determines whether to accept the SMF Deregistration request or reject it:

a) Accept the SMF Deregistration Request, but not remove stored SMF Registration Context; or, b) Reject the SMF Deregistration Request, with appropriate Reject Cause.

The UDM may take various policy to determine whether to accept SMF Deregistration Request in the case of bullet (iii) above. For instance:

If the HPLMN supports MA-PDU session serving, the UDM might be configured with locally policy to accept the SMF Deregistration in the case of bullet (iii), i.e. performs action as bullet (a).

Or, if the DNN configuration within UE subscription indicates the DNN can be applies to MA-PDU session, the UDM accepts the SMF Deregistration in the case of bullet (iii), i.e. performs action as bullet (a).

Or, if the DNN configuration within UE subscription indicates the DNN can be applies to MA-PDU session and the MA-PDU session is downgrade allowed, the UDM accepts the SMF Deregistration in the case of bullet (iii), i.e. performs action as bullet (a).

17. The UDM sends SMF Deregistration response to the H-SMF1.

18. The H-SMF1 release the resources of the MA-PDU session, and sends PDU Session Release Response to the UE.

The procedure described in FIG. 6 can easily solve the conflict problem of SMF Registration/Deregistration to UDM, especially when applied to MA-PDU session establishment and release in Home-Routed roaming scenario.

SMF: Provides SMF Set ID in SMF Registration/SMF Deregistration request to the UDM;

UDM: On receiving SMF Set ID in SMF Registration, store the SMF Set ID in SMF Registration Context.

UDM: On receiving SMF Deregistration request, compare the SMF Set ID provisioned in the request with the SMF Set ID in the stored SMF Registration Context, and perform corresponding action, e.g. accept the SMF Deregistration request or reject the SMF Deregistration request.

need dependent claims to address the UDM behavior of accept the SMF Deregistration but not remove the SMF Registration Context from UDM.

Figure 7:
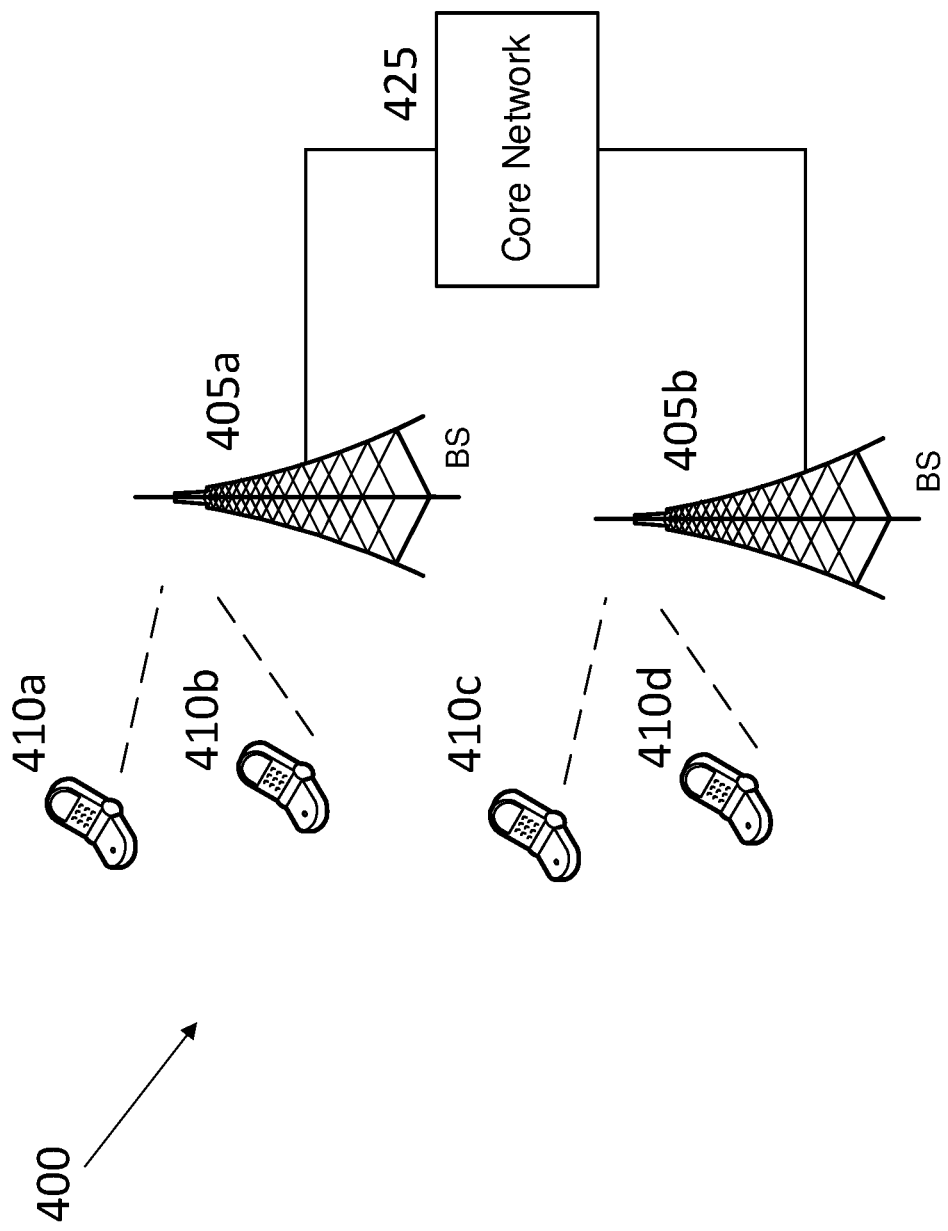
FIG. 7 is an example of a communication network.

FIG. 7 shows an example of a wireless communication system 400 where techniques in accordance with one or more embodiments of the present technology can be applied.

A wireless communication system 400 can include one or more base stations (BSs) 405a, 405b, one or more wireless devices 410a, 410b, 410c, 410d, and a core network 425. A base station 405a, 405b can provide wireless service to wireless devices 410a, 410b, 410c and 410d in one or more wireless sectors. In some implementations, a base station 405a, 405b includes directional antennas to produce two or more directional beams to provide wireless coverage in different sectors.

The core network 425 can communicate with one or more base stations 405a, 405b. The core network 425 provides connectivity with other wireless communication systems and wired communication systems. The core network may include one or more service subscription databases to store information related to the subscribed wireless devices 410a, 410b, 410c, and 410d. A first base station 405a can provide wireless service based on a first radio access technology, whereas a second base station 405b can provide wireless service based on a second radio access technology. The base stations 405a and 405b may be co-located or may be separately installed in the field according to the deployment scenario. The wireless devices 410a, 410b, 410c, and 410d can support multiple different radio access technologies. The techniques and embodiments described in the present document may be implemented by the base stations of wireless devices described in the present document.

Figure 8:
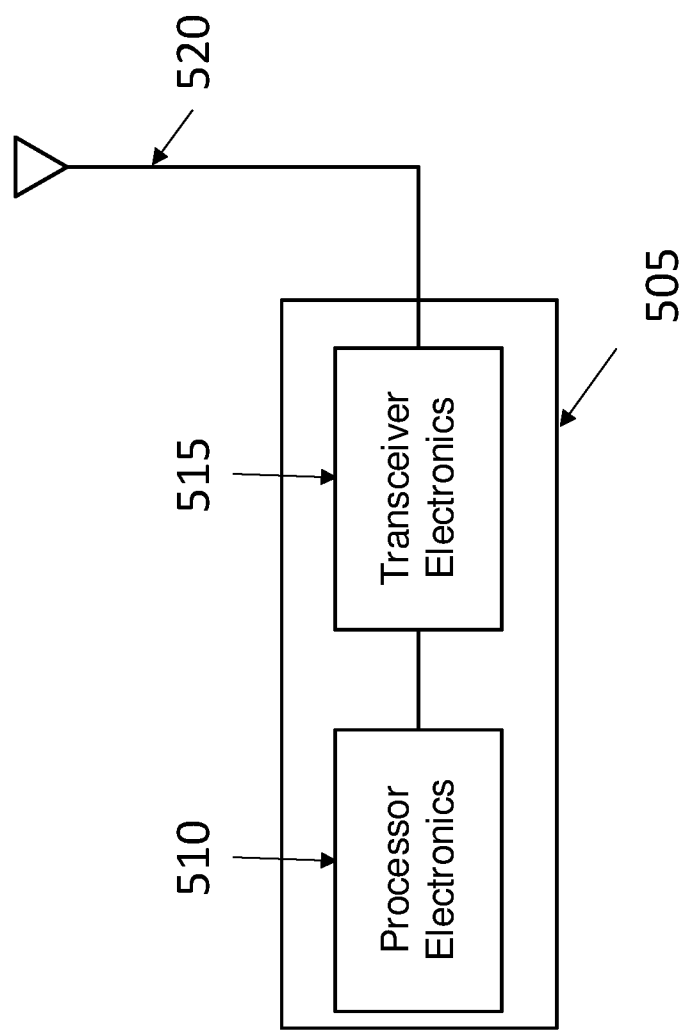
FIG. 8 is an example of a hardware platform for implementing one or more methods described in the present document.

FIG. 8 is a block diagram representation of a portion of a radio station in accordance with one or more embodiments of the present technology can be applied. A radio station 505 such as a base station or a wireless device (or UE) can include processor electronics 510 such as a microprocessor that implements one or more of the wireless techniques presented in this document. The radio station 505 can include transceiver electronics 515 to send and/or receive wireless signals over one or more communication interfaces such as antenna 520. The radio station 505 can include other communication interfaces for transmitting and receiving data. Radio station 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the radio station 505.

The various technical solutions and embodiments described in the present document may be used in future 3GPP networks for operation of backward compatible MA-PDU sessions. Some embodiments may preferably incorporate some of the following solutions.

Figure 9:
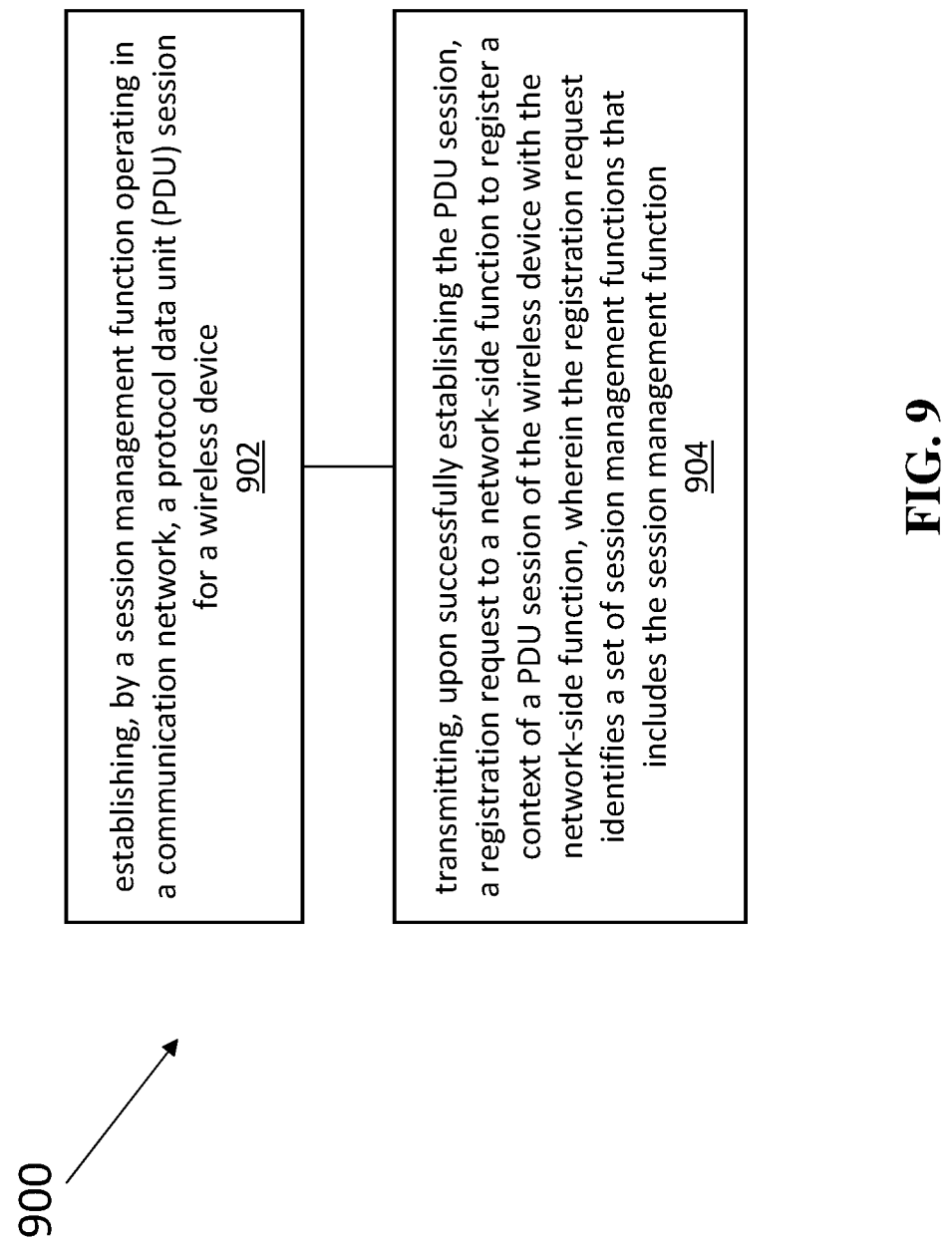
FIG. 9 to 16 are flowcharts for example methods of digital communication.
Figure 10:
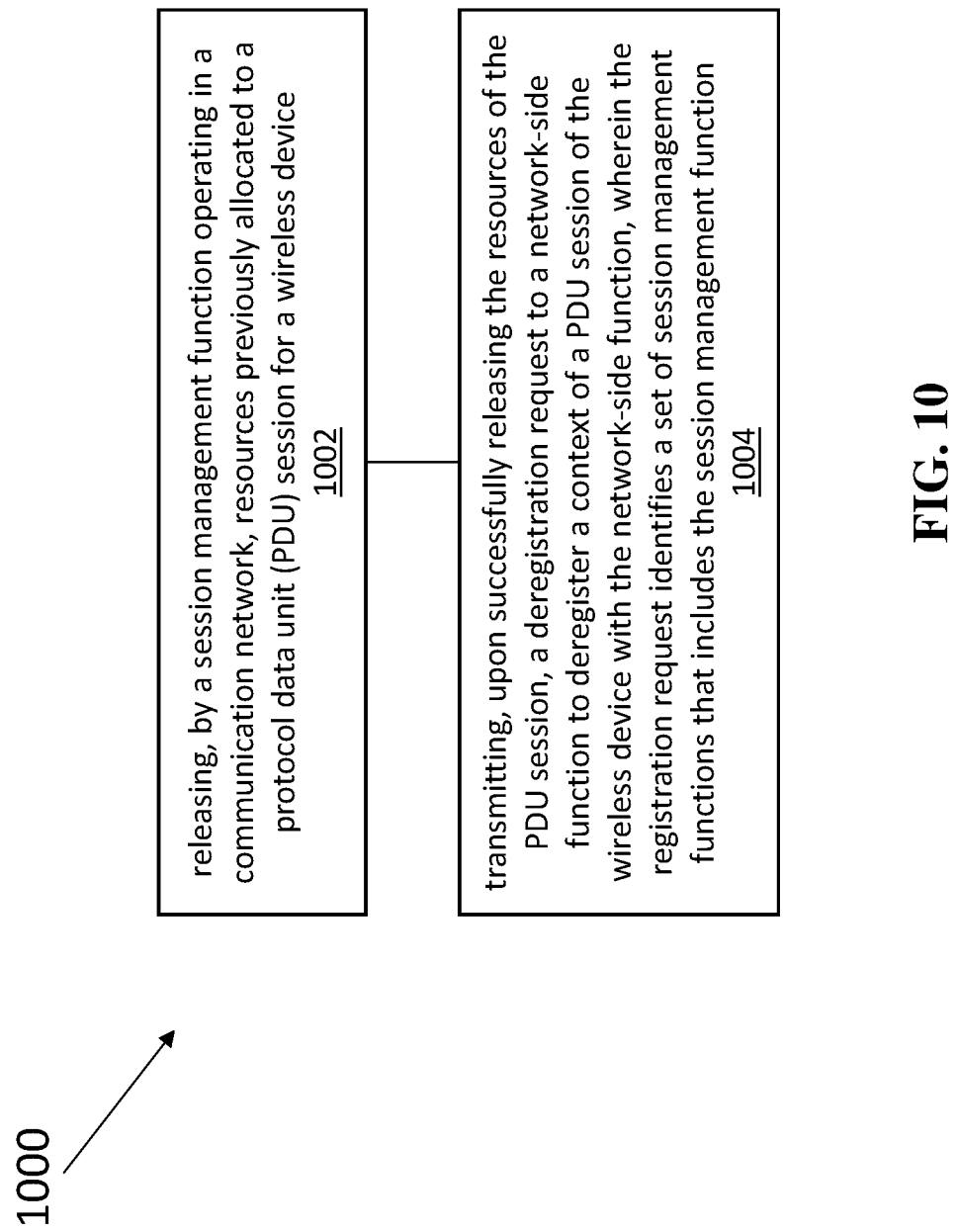

1. A method of digital communication (e.g., method 900 in FIG. 9), comprising: establishing (902), by a session management function operating in a communication network, a protocol data unit (PDU) session for a wireless device; and transmitting (904), upon successfully establishing the PDU session, a registration request to a network-side function to register a context of a PDU session of the wireless device with the network-side function, wherein the registration request identifies a set of session management functions that includes the session management function.

2. The method of solution 1, wherein the network-side function comprises a unified data management (UDM) function.

3. The method of solutions 1-2, wherein the PDU session is a multi-access PDU session the MA-PDU session that provides data connectivity through networks implementing different radio access technologies.

In some implementations, an SMF may preferably incorporate the above methods for performing registration of a PDU session.

4. A method of digital communication (e.g., method 100 in FIG. 1000), comprising: releasing (1002), by a session management function operating in a communication network, resources previously allocated to a protocol data unit (PDU) session for a wireless device; and transmitting (1004), upon successfully releasing the resources of the PDU session, a deregistration request to a network-side function to deregister a context of a PDU session of the wireless device with the network-side function, wherein the registration request identifies a set of session management functions that includes the session management function.

5. The method of solution 4, wherein the network-side function comprises a unified data management (UDM) function.

6. The method of solutions 4-5, wherein the PDU session is a multi-access PDU session the MA-PDU session that provides data connectivity through networks implementing different radio access technologies.

In some implementations, an SMF may preferably incorporate the above methods for performing deregistration of a PDU session.

Figure 11:
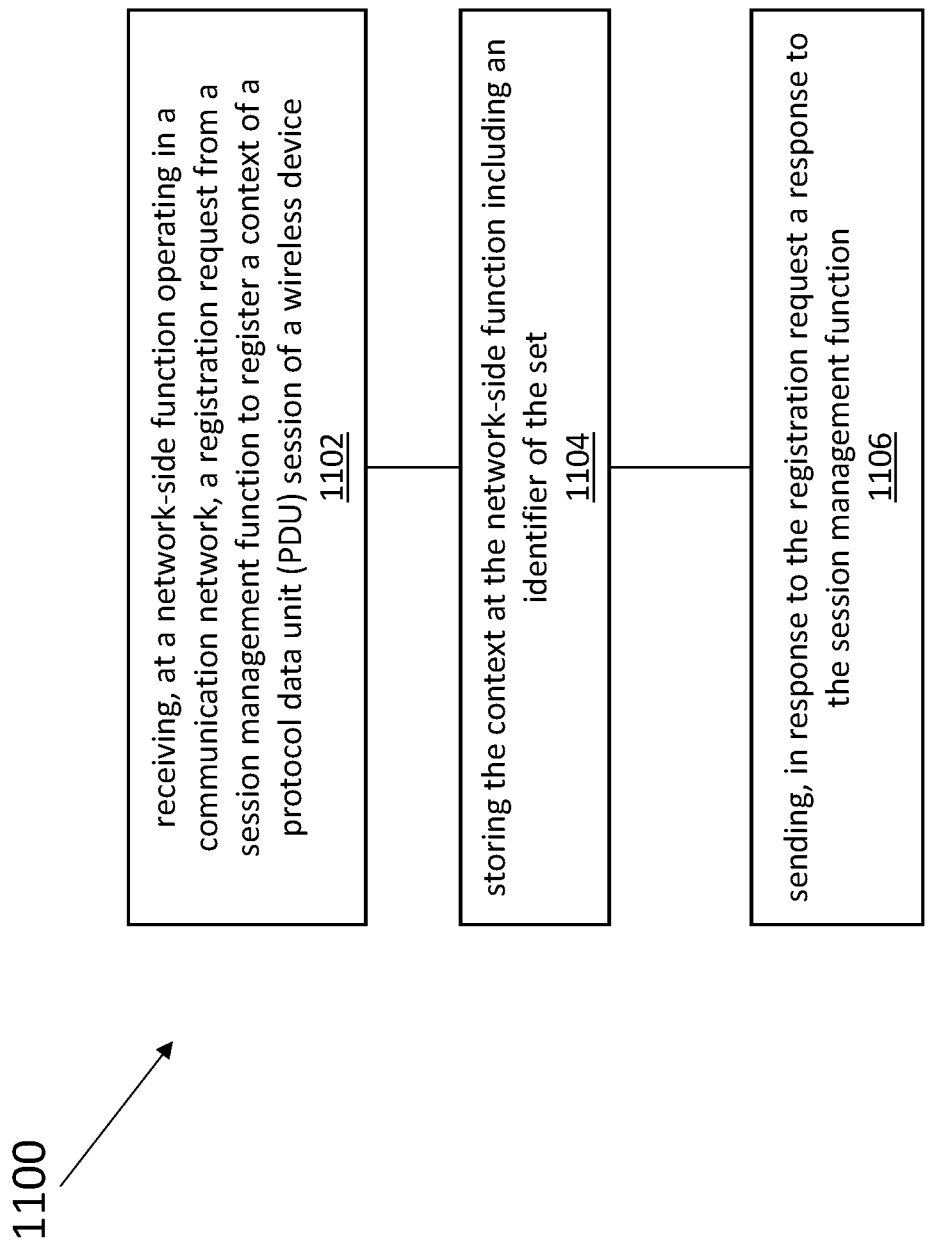

7. A method of digital communication (e.g., method 1100 depicted in FIG. 11), comprising: receiving (1102), at a network-side function operating in a communication network, a registration request from a session management function to register a context of a protocol data unit (PDU) session of a wireless device, wherein the registration request identifies a set of session management functions that includes the session management function; storing (1104) the context at the network-side function including an identifier of the set; and sending (1106), in response to the registration request a response to the session management function.

8. The method of solution 7, wherein the network-side function comprises a unified data management (UDM) function.

9. The method of solutions 7-8, wherein the PDU session is a multi-access PDU session the MA-PDU session that provides data connectivity through networks implementing different radio access technologies.

In some implementations, a UDM may preferably incorporate the above methods for performing registration of a PDU session.

Figure 12:
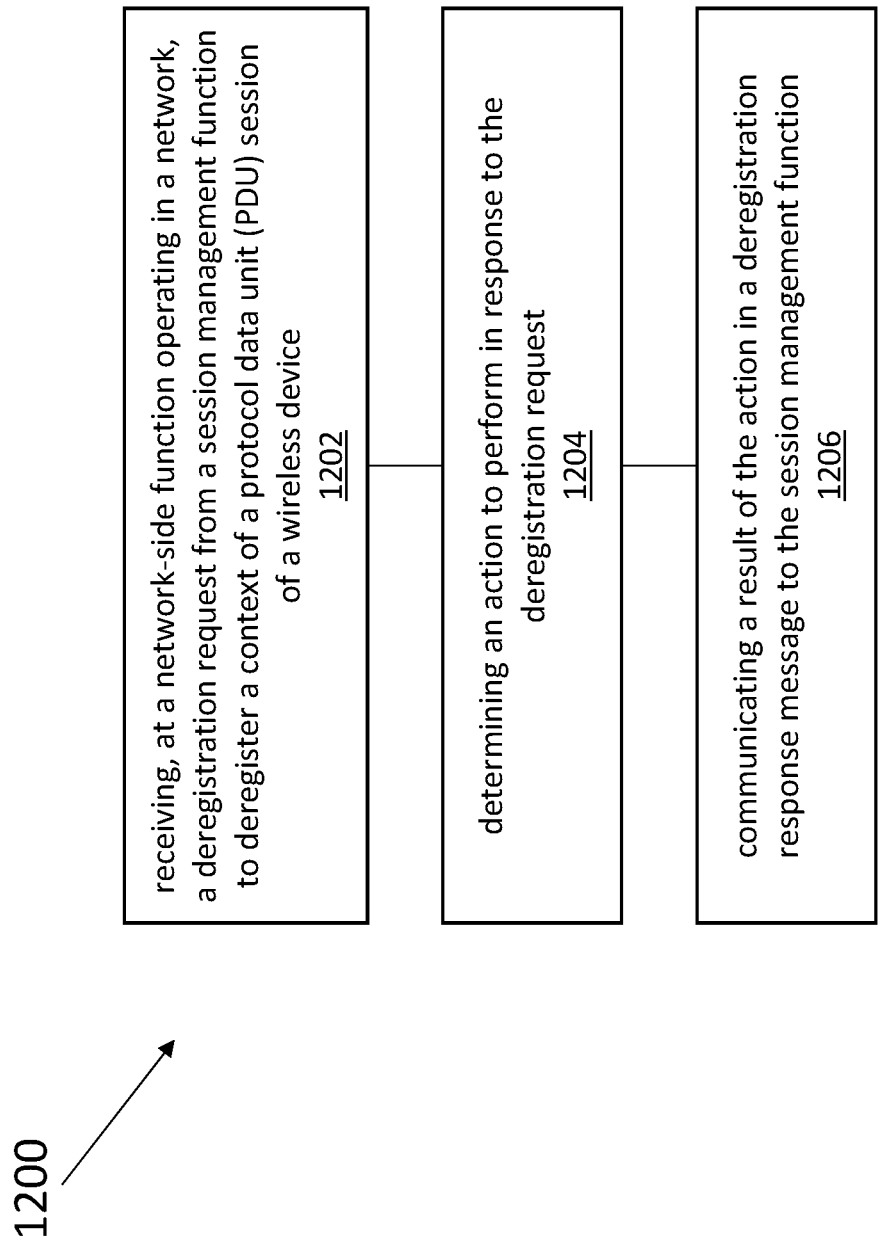

10. A method of digital communication (e.g., method 1200 depicted in FIG. 12), comprising: receiving (1202), at a network-side function operating in a network, a deregistration request from a session management function to deregister a context of a protocol data unit (PDU) session of a wireless device, wherein the deregistration request identifies a set of session management functions that includes the session management function; determining (1204) an action to perform in response to the deregistration request, wherein the action is one of:

(a) accepting the deregistration request and deregistering the context in case that the context was registered due to a registration request received from the session management function, or (b) accepting the deregistration request and deregistering the context in case that the context was registered due to a registration request received from another session management function included in the set of session management functions, or (c) processing the deregistration request based on a rule; and communicating (1206) a result of the action in a deregistration response message to the session management function.

11. The method of solution 10, wherein the rule specifies to refrain from deregistering the context.

12. The method of solution 11, wherein the deregistration response message includes a rejection cause.

13. The method of solution 10, wherein the rule specifies to accept the deregistration request without deregistering the context.

14. The method of any of solutions 10-13, wherein the network-side function comprises a unified data management (UDM) function.

15. The method of solutions 10-14, wherein the PDU session is a multi-access PDU session the MA-PDU session that provides data connectivity through networks implementing different radio access technologies.

In some implementations, a UDM may preferably incorporate the above methods for performing deregistration of a PDU session.

Figure 13:
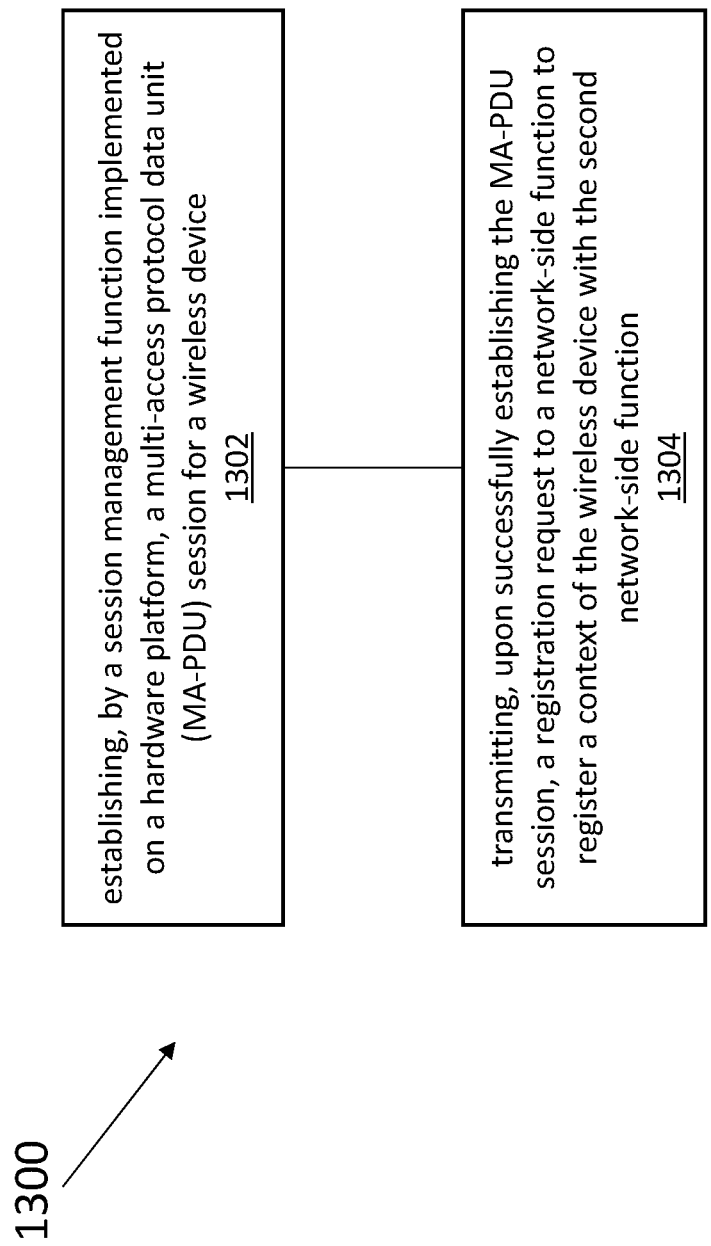

16. A method of digital communication (e.g., method 1300 depicted in FIG. 13), comprising: establishing (1302), by a session management function implemented on a hardware platform, a multi-access protocol data unit (MA-PDU) session for a wireless device, wherein the MA-PDU session provides data connectivity through networks implementing different radio access technologies; transmitting (1304), upon successfully establishing the MA-PDU session, a registration request to a network-side function to register a context of the wireless device with the second network-side function, wherein the registration request identifies a set of session management functions that includes the session management function. The MA-PDU session may be established over one radio access (e.g., of a home network of the wireless device).

17. The method of solution 16, wherein the session management function is a home network session management function for the wireless device.

18. The method of any of solutions 16-17, wherein the registration request further includes an identifier of the MA-PDU session, a session management function instance ID for the session management function, and an identifier of the set of session management functions.

In some implementations, an SMF may preferably incorporate the above methods for supporting MA-DU sessions.

Figure 14:
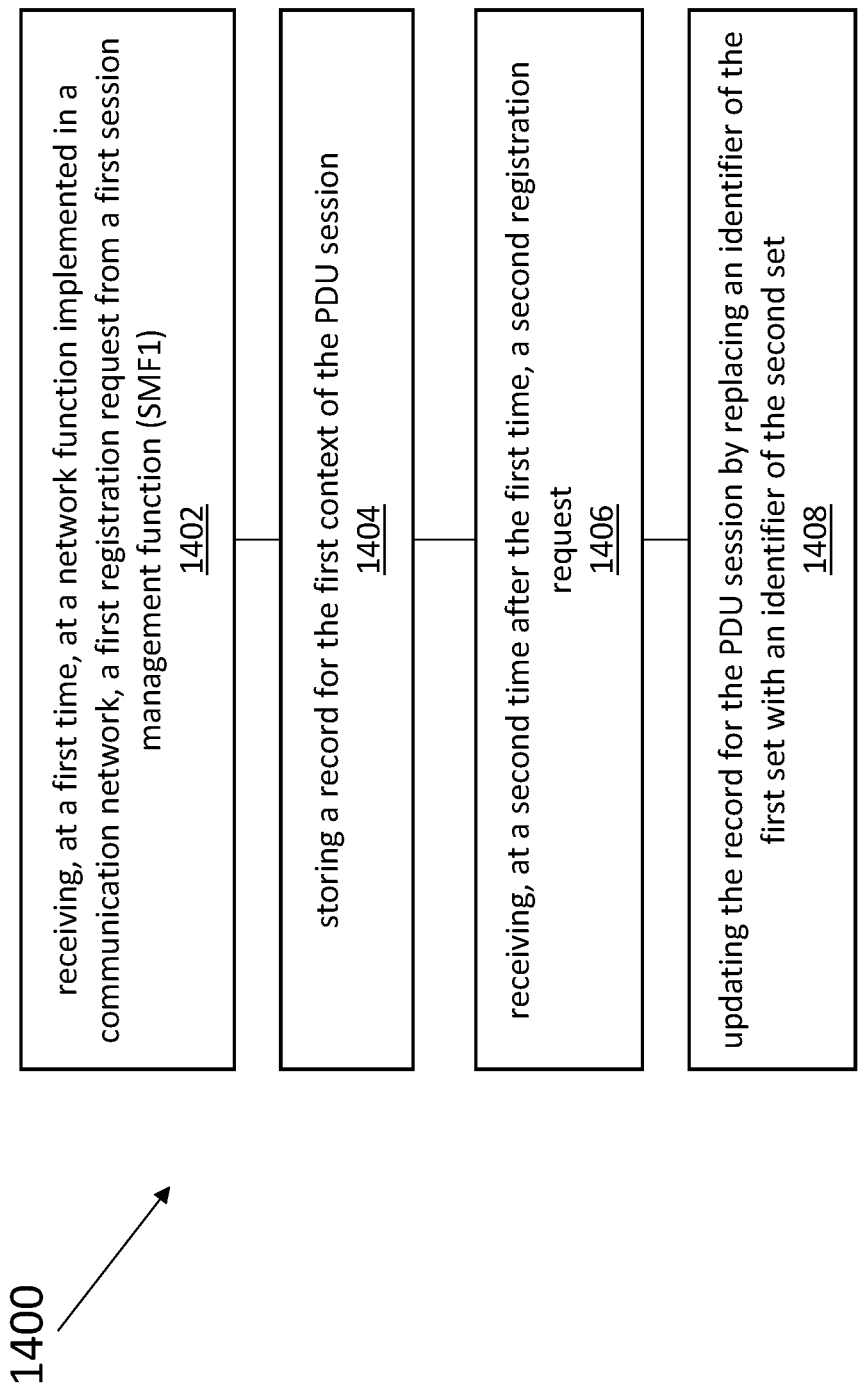

19. A method of digital communication (e.g., method 1400 depicted in FIG. 14), comprising: receiving (1402), at a first time, at a network function implemented in a communication network, a first registration request from a first session management function (SMF1) to register a first context of a protocol data unit (PDU) session of a wireless device, wherein the registration request identifies a first set of session management functions that includes SMF1; storing (1404) a record for the first context of the PDU session; receiving (1406), at a second time after the first time, at the network function implemented using the hardware platform, a second registration request from a second session management function (SMF2) to register a second context of the PDU session of the wireless device, wherein the registration request identifies a second set of session management functions that includes SMF2; updating (1408) the record for the PDU session by replacing an identifier of the first set with an identifier of the second set.

20. The method of solution 19, wherein SMF1 is a home network session management function for the wireless device.

21. The method of any of solutions 19-20, wherein the PDU session is a multi-access PDU session.

In some implementations, a UDM may preferably incorporate the above methods for performing registration of a MA-PDU session.

Figure 15:
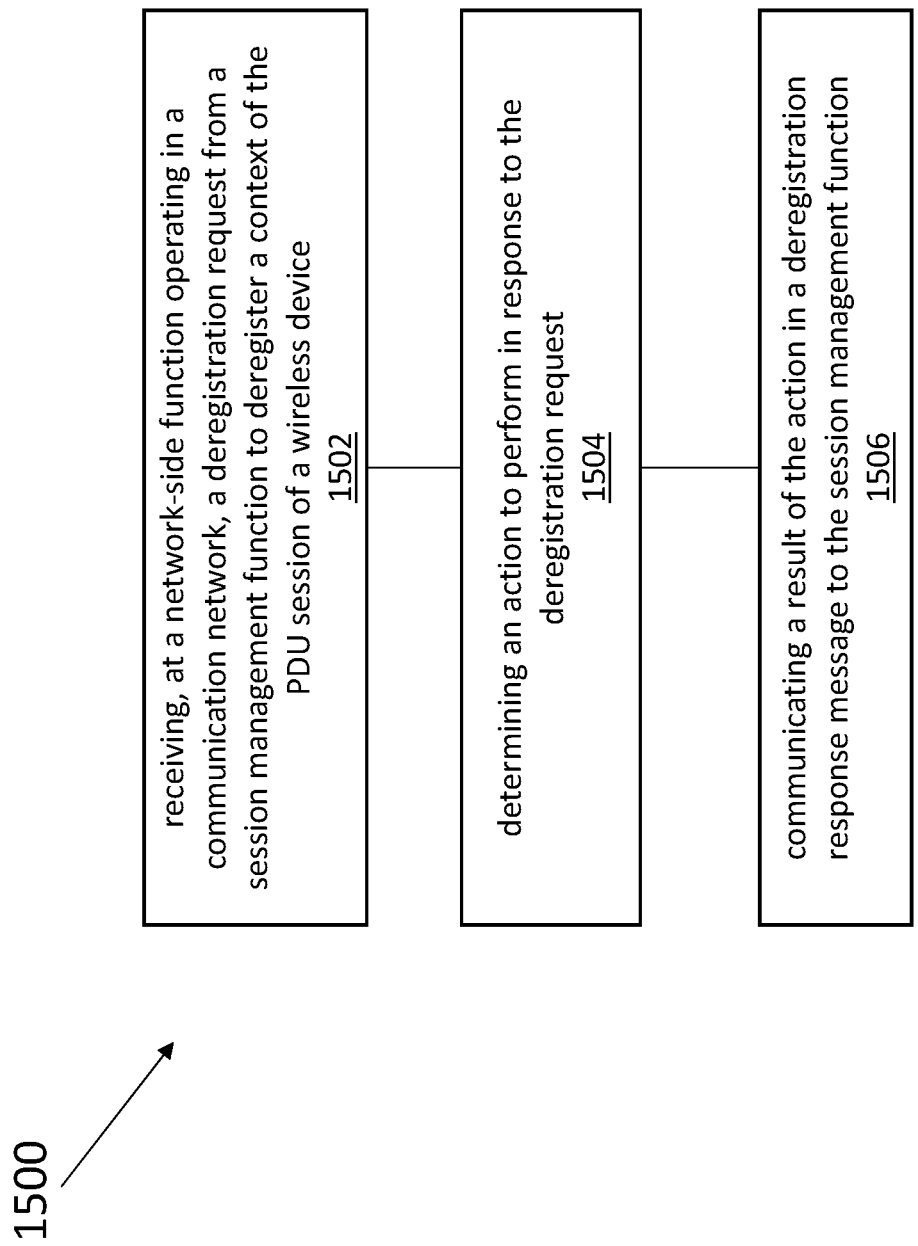

22. A method of digital communication (e.g., method 1500 depicted in FIG. 15), comprising: receiving (1502), at a network-side function operating in a communication network, a deregistration request from a session management function to deregister a context of the PDU session of a wireless device, wherein the deregistration request identifies a set of session management functions that includes the session management function; determining (1504) an action to perform in response to the deregistration request, wherein the action is one of:

(a) accepting the deregistration request and deregistering the context in case that the context was registered due to a registration request received from the session management function, or (b) accepting the deregistration request and deregistering the context in case that the context was registered due to a registration request received from another session management function included in the set of session management functions, or (c) processing the deregistration request based on a rule; and Communicating (1506) a result of the action in a deregistration response message to the session management function.

23. The method of solution 22, wherein the rule specifies to refrain from deregistering the context.

24. The method of solution 23, wherein the deregistration response message includes a rejection cause.

25. The method of solution 22, wherein the rule specifies to accept the deregistration request without deregistering the context.

In some implementations, a UDM may preferably incorporate the above methods for performing deregistration of a PDU session.

Figure 16:
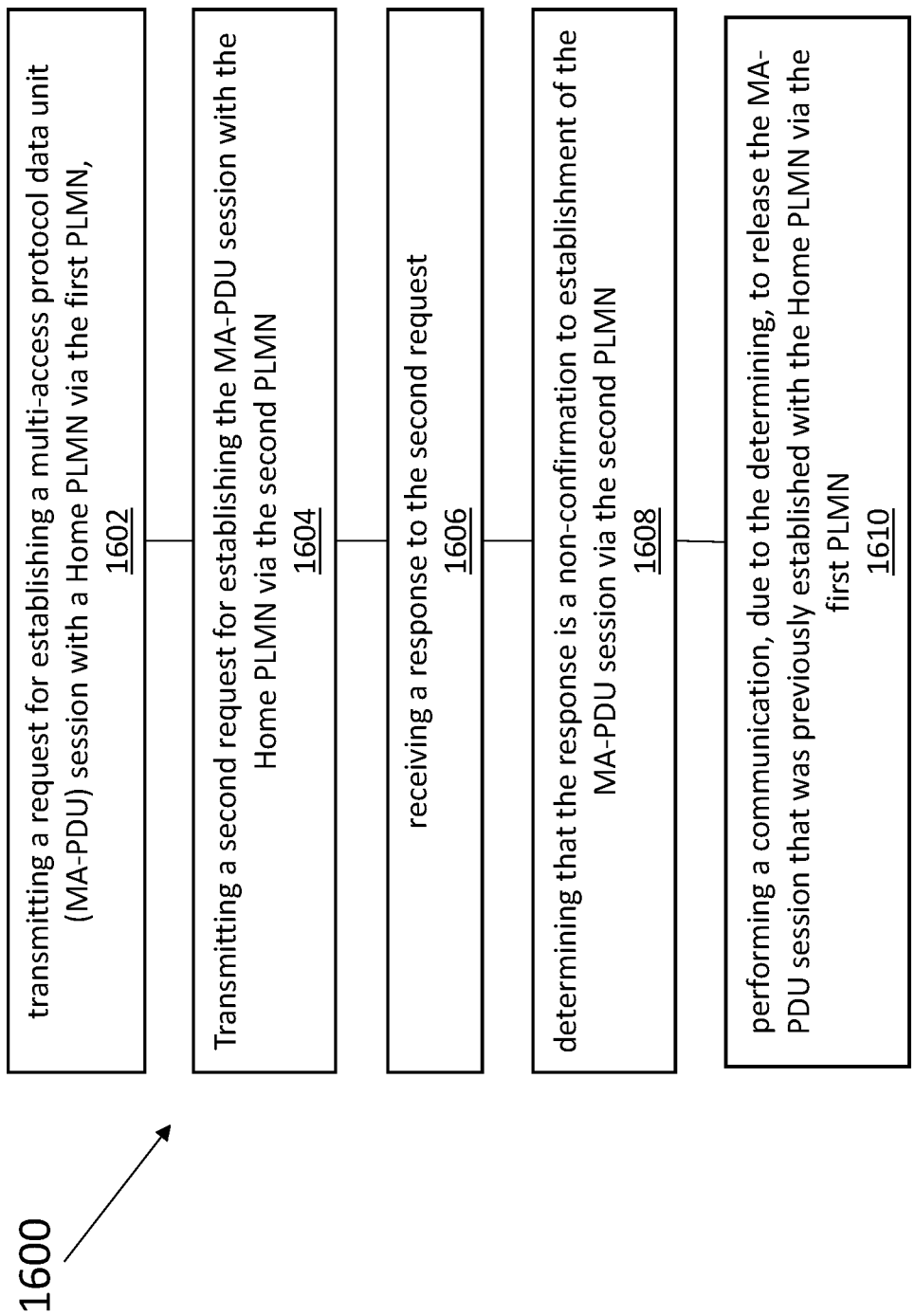

26. A method of digital communication (e.g., method 1600 depicted in FIG. 16), comprising: transmitting (1602), at a first time, by a wireless device operating in a first public land mobile network (PLMN), a request for establishing a multi-access protocol data unit (MA-PDU) session with a Home PLMN via the first PLMN (e.g., over a first access network or a first radio access network), the MA-PDU thus being successfully established; transmitting (1604), at a second time after the first time, with the wireless device operating in a second PLMN, a second request for establishing the MA-PDU session with the Home PLMN via the second PLMN (e.g., over a second radio access network); receiving (1606) a response to the second request; determining (1608) that the response is a non-confirmation to establishment of the MA-PDU session via the second PLMN; and performing (1610) a communication, due to the determining, to release the MA-PDU session that was previously established with the Home PLMN via the first PLMN. For example, the non-confirmation may be indicated in the response because the response omits multi-access PDU session information.

27. The method of solution 26, wherein the first PLMN is the home PLMN and the second PLMN is a visited PLMN.

28. The method of any of solutions 26-27, wherein the request is sent to a network function serving the first PLMN, wherein the network function is a session management function, a unified data management function or an access and mobility management function.

29. The method of any of solutions 26-27, wherein the communication is performed by transmitting a message to a network function serving the first PLMN, wherein the network function is a session management function, a unified data management function or an access and mobility management function.

30. The method of any of solutions 26-29, wherein the second request is sent to a second network function serving the second PLMN, wherein the second network function is a session management function, a unified data management function or an access and mobility management function.

In some implementations, a communication apparatus such as a wireless device, a mobile station, a user equipment (UE) may preferably incorporate the above methods for performing registration of a PDU session.

31. A digital communication apparatus comprising a processor configured to implement a method recited in any one or more of solutions 1-30.

32. A computer readable medium product having processor-executable code for implementing one or more of methods 1-30 stored thereon.

33. A method, apparatus, or system disclosed in the present application.

The various network functions described in the present document may be implemented using one or more hardware platforms (e.g., computers or cloud computing) that comprise a network interface and a processor.

It will be appreciated that the present document discloses techniques that can be embodied in various embodiments to provide support for MA-PDU session establishment and operation (e.g., registration and deregistration). One advantageous aspect of the disclosed techniques is to enable backward compatibility with network functions that are unaware of the upcoming multi-access PDU session technology.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of digital communication, comprising:
   receiving, by a session management function operating in a communication network, a context update request to update a context of a protocol data unit (PDU) session for a wireless device that has been established by a different session management function;
   transmitting, by the session management function, a registration request to a unified data management (UDM) function to register the context of the PDU session of the wireless device established by the different session management function with the UDM function, wherein the registration request identifies a set of session management functions that includes the session management function and the different session management function;
   receiving, by the session management function, a registration response from the UDM function;
   transmitting, by the session management function, a deregistration request to the UDM function to deregister the context of the PDU session of the wireless device established by the different session management function; and
   receiving, by the session management function, a deregistration response message indicating removal of data associated with the registration request.

2. The method of claim 1, wherein, upon a failure of deregistration, the deregistration response message includes a rejection cause.

3. The method of claim 1, wherein the registration request is a Nudm_UECM_Registration Request message.

4. The method of claim 1, wherein the deregistration request is a Nudm_UECM_Deregistration message.

5. A method of digital communication, comprising:
   receiving, at a unified data management (UDM) function operating in a communication network, a registration request from a second session management function to register a context of a protocol data unit (PDU) session of a wireless device that has been established by a first session management function, wherein the registration request identifies a set of session management functions that includes the first session management function and the second session management function, the first session management function and the second session management function being different;
   sending, in response to the registration request, a response to the second session management function;
   receiving, by the UDM function, a deregistration request from the second session management function to deregister the context of the PDU session of the wireless device that has been established by the first session management function; and
   transmitting, by the UDM function, a deregistration response message indicating removal of data associated with the registration request.

6. The method of claim 5, further comprising:
   storing the context of the PDU session of the wireless device by the UDM function.

7. The method of claim 5, wherein, upon a failure of deregistration, the deregistration response message includes a rejection cause.

8. The method of claim 5, wherein the registration request is a Nudm_UECM_Registration Request message.

9. The method of claim 5, wherein the deregistration request is a Nudm_UECM_Deregistration message.

10. A digital communication apparatus implemented as a session management function comprising a processor configured to:
- receive a context update request to update a context of a protocol data unit (PDU) session for a wireless device that has been established by a different session management function;
- transmit a registration request to a unified data management (UDM) function to register the context of the PDU session of the wireless device established by the different session management function with the UDM function, wherein the registration request identifies a set of session management functions that includes the session management function and the different session management function;
- receive a registration response from the UDM function;
- transmit a deregistration request to the UDM function to deregister the context of the PDU session of the wireless device established by the different session management function; and
- receive a deregistration response message indicating removal of data associated with the registration request.

11. The digital communication apparatus of claim 10, wherein, upon a failure of deregistration, the deregistration response message includes a rejection cause.

12. The digital communication apparatus of claim 10, wherein the registration request is a Nudm_UECM_Registration Request message.

13. The digital communication apparatus of claim 10, wherein the deregistration request is a Nudm_UECM_Deregistration message.

14. A digital communication apparatus implemented as a unified data management (UDM) function comprising a processor configured to:
- receive a registration request from a second session management function to register a context of a protocol data unit (PDU) session of a wireless device that has been established by a first session management function, wherein the registration request identifies a set of session management functions that includes the first session management function and the second session management function, the first session management function and the second session management function being different;
- send, in response to the registration request, a response to the second session management function;
- receive a deregistration request from the second session management function to deregister the context of the PDU session of the wireless device that has been established by the first session management function; and
- transmit a deregistration response message indicating removal of data associated with the registration request.

15. The digital communication apparatus of claim 14, wherein the processor is further configured to:
- store the context of the PDU session of the wireless device.

16. The digital communication apparatus of claim 14, wherein, upon a failure of deregistration, the deregistration response message includes a rejection cause.

17. The digital communication apparatus of claim 14, wherein the registration request is a Nudm_UECM_Registration Request message.

18. The digital communication apparatus of claim 14, wherein the deregistration request is a Nudm_UECM_Deregistration message.

* * * * *